(12) United States Patent
Savic et al.

(10) Patent No.: US 11,920,484 B2
(45) Date of Patent: Mar. 5, 2024

(54) ENERGY STORAGE DEVICE AND METHOD FOR STORING ENERGY

(71) Applicant: E2S Power AG, Wilen b. Wollerau (CH)

(72) Inventors: Sasha Savic, Wettingen (CH); Vladimir Vassiliev, Turgi (CH); Dylan Cuskelly, Edgeworth (AU); Sergey Pancheshnyi, Zurich (CH); Erich Herold Kisi, Merewether (AU)

(73) Assignee: E2S Power AG, Wilen b. Wollerau (CH)

( * ) Notice: Subject to any disclaimer, the term of this patent is extended or adjusted under 35 U.S.C. 154(b) by 135 days.

(21) Appl. No.: 17/619,180

(22) PCT Filed: Mar. 23, 2020

(86) PCT No.: PCT/EP2020/057977
§ 371 (c)(1),
(2) Date: Dec. 14, 2021

(87) PCT Pub. No.: WO2020/254001
PCT Pub. Date: Dec. 24, 2020

(65) Prior Publication Data
US 2022/0307386 A1  Sep. 29, 2022

(30) Foreign Application Priority Data
Jun. 17, 2019 (EP) .................................. 19180472

(51) Int. Cl.
*F01D 25/00* (2006.01)
(52) U.S. Cl.
CPC .......... *F01D 25/00* (2013.01); *F05D 2220/31* (2013.01)

(58) Field of Classification Search
CPC ... F01D 25/00; F05D 2220/31; F05D 2260/42
See application file for complete search history.

(56) References Cited

U.S. PATENT DOCUMENTS

| 4,136,276 A | 1/1979 | Ashe |
| 7,947,120 B2 * | 5/2011 | Deckman ........... B01D 53/0462 96/108 |

(Continued)

FOREIGN PATENT DOCUMENTS

| CN | 101023314 A | 8/2007 |
| CN | 103353060 A | 10/2013 |

(Continued)

OTHER PUBLICATIONS

International Search Report for PCT/EP2020/057977 dated Jun. 9, 2020 [PCT/ISA/210].

(Continued)

*Primary Examiner* — Shafiq Mian
(74) *Attorney, Agent, or Firm* — Sughrue Mion, PLLC

(57) ABSTRACT

An energy storage device is provided with at least one energy storage unit (1). The energy storage unit (1) comprises a thermal storage element (3) made of a solid material and an electrical heating device (5) for heating the thermal storage element (3). According to a first concept, the electrical heating device (5) is adapted to heat the thermal storage element (3) by means of generating an electric current within the material of the thermal storage element (3). According to a second concept, an electric gas insulation (8) is provided, in order to electrically insulate the electrical heating device (5) from the thermal storage element (3). Furthermore, a method for storing energy by means of such an energy storage device is provided.

19 Claims, 16 Drawing Sheets

(56) References Cited

U.S. PATENT DOCUMENTS

Figure 1:
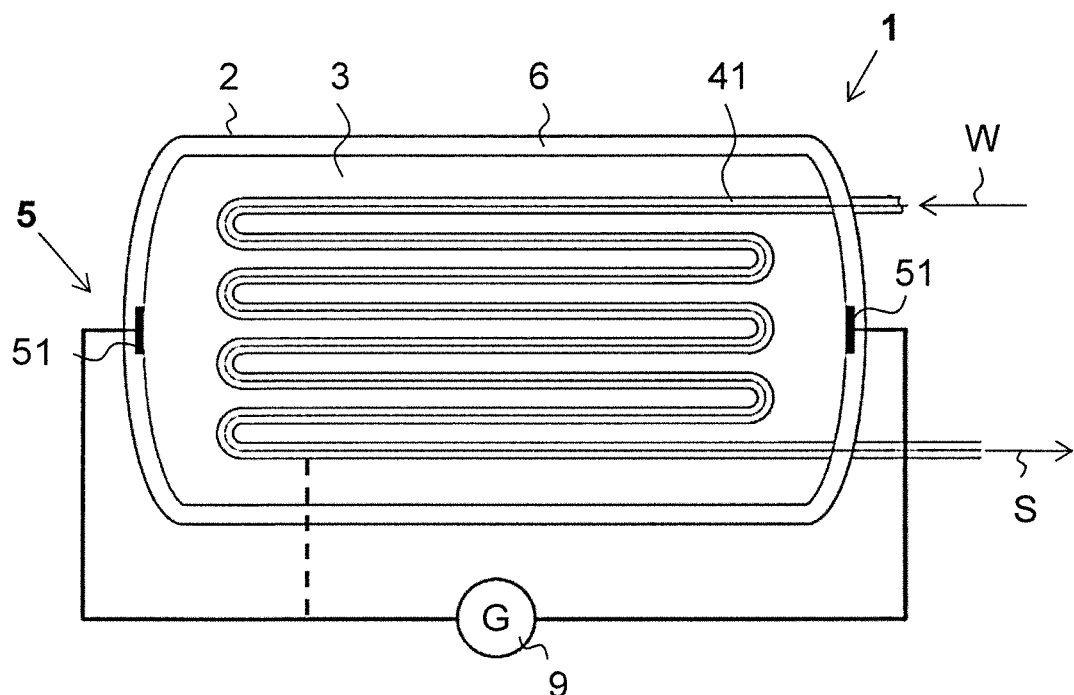

| | | | |
|---|---|---|---|
| 8,025,720 B2* | 9/2011 | Barclay | B01D 53/0462 |
| | | | 96/115 |
| 9,845,549 B2* | 12/2017 | Harada | C30B 29/36 |
| 2006/0107664 A1* | 5/2006 | Hudson | F28D 20/0056 |
| | | | 60/659 |
| 2007/0209365 A1 | 9/2007 | Hamer et al. | |
| 2012/0085087 A1 | 4/2012 | Canal et al. | |
| 2014/0000289 A1* | 1/2014 | Brouqueyre | F25J 1/0262 |
| | | | 62/45.1 |
| 2019/0063291 A1* | 2/2019 | Ker | F01N 3/206 |
| 2019/0253000 A1* | 8/2019 | Kratchman | H02N 2/10 |

FOREIGN PATENT DOCUMENTS

| | | |
|---|---|---|
| CN | 108738178 A | 11/2018 |
| DE | 44 10 440 A1 | 8/1995 |
| DE | 10 2011 112 280 A1 | 3/2013 |
| EP | 1 666 828 A2 | 6/2006 |
| WO | 91/014906 A1 | 10/1991 |
| WO | 95/025416 A1 | 9/1995 |
| WO | 2004/072452 A1 | 8/2004 |
| WO | 2005/088218 A1 | 9/2005 |
| WO | 2012/038620 A1 | 3/2012 |
| WO | 2014/063191 A1 | 5/2014 |
| WO | WO-2014063191 A1 * | 5/2014 ............. C09K 5/063 |
| WO | 2016/176174 A1 | 11/2016 |

OTHER PUBLICATIONS

Written Opinion for PCT/EP2020/057977 dated Jun. 9, 2020 [PCT/ISA/237].

* cited by examiner

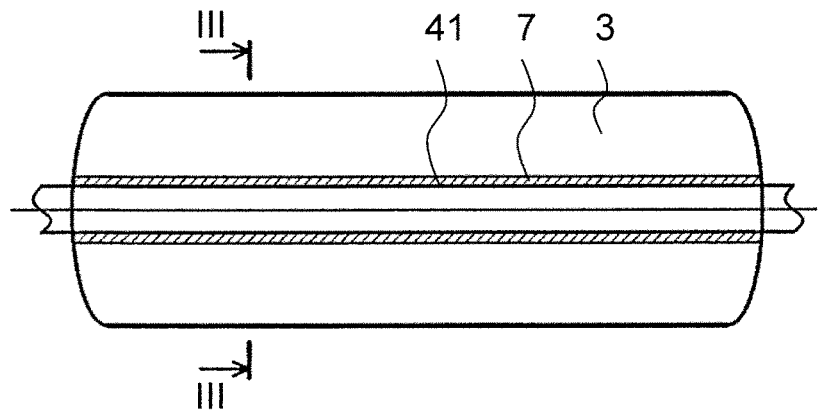
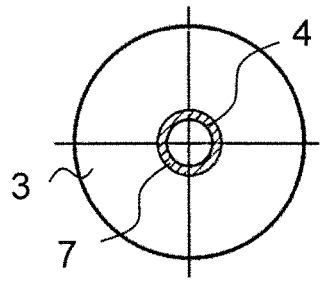
FIG. 3a  FIG. 3b
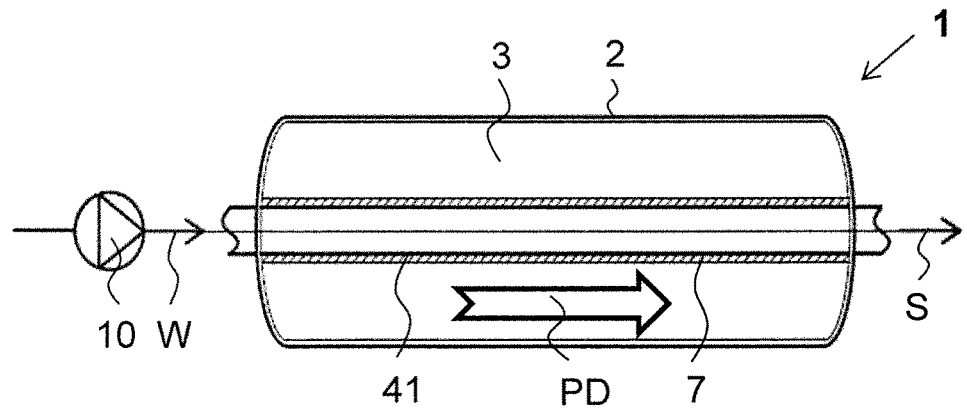
FIG. 4

US 11,920,484 B2

ENERGY STORAGE DEVICE AND METHOD FOR STORING ENERGY

CROSS REFERENCE TO RELATED APPLICATIONS

This application is a National Stage of International Application No. PCT/EP2020/057977 filed Mar. 23, 2020, claiming priority based on European Patent Application No. 19180472.3 filed Jun. 17, 2019.

TECHNICAL FIELD

The present invention concerns an energy storage device for storing thermal energy. The invention also concerns a method for storing energy by means of such an energy storage device.

PRIOR ART

For generating electricity, renewable sources such as wind and solar power are increasingly used. The problem, however, very often associated with renewable energy sources is the continuous availability of the generated electric power. For example, wind has an intermittent nature and is not blowing constantly for 24 hours and seven days a week. Solar energy is only available during daylight and is highly dependent on weather conditions, in particular the amount of clouds. Therefore, to make renewable energy sources more attractive and to increase the availability of the electric energy generated from such sources, energy needs to be stored. Today, there are different energy storage technologies available, ranging from batteries, pump storage systems, compressed air storages and various versions of energy storage using heat, either at high or at low end. By means of these energy storage technologies, energy is stored in the form of e.g. thermal energy, pressurized air or chemical energy in times when a surplus of the renewable source is available and is later converted into electric energy and used during times of high demand and/or low availability of the renewable source.

The main issues that today's energy storage systems are facing are their efficiency and their relatively low energy storage density (stored energy per unit of surface or volume).

Systems in which energy is stored based on compressed air are for example disclosed in WO 2004/072452 A1, DE 10 2011 112 280 A1, US 2012/0085087 A1, DE 44 10 440 A1, WO 2016/176174 A1 and CN 103353060 A.

In the yet unpublished PCT-application No. PCT/EP2018/052377 of the same applicant, an energy storage device is proposed in which thermal storage elements made of a solid material are arranged within a gas receptacle. The thermal storage elements can be heated up by means of an electrical heating device. Thus, the device allows the combined storage of both thermal energy and compressed gas. The stored compressed gas is already heated and, as a result, can directly be used to e.g. drive a gas turbine.

With regard to large-scale applications, molten salt energy storage systems are known which are based on the heating of liquid salt. In these systems, salt is heated during times of high energy availability and used during times, when energy is needed, to create heated steam for driving a steam turbine.

Most of the currently available energy storage systems for the generation of steam have the common drawback, that an intermediate medium is used for charging the thermal storage and/or for extracting heat for steam production. The intermediate medium (e.g. air, molten salt, etc.) is heated by an independent energy source and the heat accumulated in the storage is used for generating steam by means of a heat transfer process. Thus, the intermediate medium is heated by means of heat transfer from the thermal storage and then transfers the obtained thermal energy to the steam in a heat exchanger. These indirect processes for transferring the energy from the storage device to the steam provide additional parasitic losses and significantly reduce system efficiency. Moreover, the additional equipment needed for circulating the intermediate medium makes the system complicated and less robust.

Recently, energy storage devices have been proposed which use solid storage materials in the form of stones or concrete, in order to store thermal energy. The stored thermal energy can be used in times of high demand to generate steam for heating or for driving a steam power plant, in order to convert the stored thermal energy back to electric energy.

In several publications, solid materials such as graphite (WO 2005/088218 A1; U.S. Pat. No. 4,136,276 A), metals (iron—EP 1 666 828 A2, steel—WO 91/14906 A1) or MGA (WO 2014/063191 A1) are proposed as storage materials. In several publications, it is suggested to heat the solid storage materials by electric resistive heaters (WO 2005/088218 A1, WO 91/14906 A1 and WO 2012/038620 A1) or by induction (U.S. Pat. No. 4,136,276 A).

For generating steam based on the stored thermal energy, it is proposed in WO 2005/088218 A1 to provide pipes, in order to guide water along the storage material. In the device as disclosed by EP 1 666 828 A2, a conduit is provided within the metallic storage material. In WO 91/14906 A1, separate blocks with baffle plates are used. The difficulty with pipes is the thermal contact resistance between the pipes and the storage material, which may require an overheating of the storage material, in order to the required steam parameters. The provision of a conduit in the storage material is only applicable in metallic storage materials that have a moderate thermal capacity. The blocks with baffle plates lead to an excessive overall size of the entire system, in order to ensure steam with the required amount and parameters.

The control of the steam parameters is a particular challenge, which is only addressed in some publications, such as in WO 2005/088218 A1. The typically proposed solutions, however, often require expensive equipment, such as hot valves, i.e. valves that regulate the flow of the hot steam.

SUMMARY OF THE INVENTION

It is an object of the present invention to provide an energy storage device for storing energy, which can be charged and discharged efficiently. Furthermore, the energy storage device should be easily usable with existing power plants, in particular gas and/or coal power plants.

In order to achieve this object, according to the first inventive concept, an energy storage device is provided with at least one energy storage unit, in particular with exactly energy storage unit, comprising
  a thermal storage element made of a solid material, for storing thermal energy; and
  an electrical heating device for heating the thermal storage element by means of electric energy.
  The electrical heating device is adapted to heat the thermal storage element by means of generating an electric current within the solid material of the thermal storage element.
The heating of the thermal storage element by means of an electric current generated within the solid material of the thermal storage element allows a very direct and, thus, particularly efficient charging process of the energy storage device. It means that the thermal energy is directly generated by the thermal storage element itself, i.e. by converting the electric current into thermal energy due to resistance or inductive heating of the solid material. Thus, the thermal storage element has a certain electric conductivity for this purpose. As a consequence, no transfer of thermal energy with possible associated losses from a heating element to the thermal storage element is taking place. No intermediate media is required for heating the thermal storage element by means of the electrical heating device. Moreover, no electric insulation between the electrical heating device and the thermal storage element is needed as in energy storage devices in which the thermal storage element is heated by indirect electrical resistive heating with heat dissipation.

The heating of the thermal storage element by means of an electric current generated directly in the solid material is particularly well suited in thermal storage elements that have a preferred electric resistivity of at least $10^{-4}$ $\Omega$m and not more than 1 $\Omega$m. In this case, the solid material of the thermal storage element is electrically conductive, but has sufficient resistance to be heated directly using a DC- or AC-voltage. Materials with the preferred electrical resistivity as indicated are rare in nature.

For generating the electric current within the solid material of the thermal storage element, the electrical heating device can, in a preferred embodiment, comprise contact electrodes that are attached to the thermal storage element. The electrical heating device in this case is adapted to apply a voltage difference between at least two contact electrodes, in order to generate an electric current through the solid material of the thermal storage element from at least one contact electrode to at least another contact electrode. With such an embodiment, a very direct and, thus, efficient heating of the thermal storage element can be achieved. The contact electrodes are preferably attached directly to the solid material of the thermal storage element. By having an electrical heating device with contact electrodes that are directly attached to the thermal storage element, it is also possibly apply direct current or alternate current for the charging process. Thus, no frequency converter is required. Furthermore, in comparison to the use of an induction coil, no cooling device is needed for cooling the inductor, which is also associated with thermal losses.

In another possible embodiment, the electrical heating device comprises an induction coil for inducing the electric current within the thermal storage element. The induction coil serves to induce an electric current within the solid material of the thermal storage element by means of electromagnetic induction. The use of an induction coil which usually comprises several windings not only allows a direct generation of an electric current within the solid material of the thermal storage element, but also allows a simple production of the energy storage device in many embodiments. Thus, inductive heating improves the charging efficiency, because it is a fast and direct process.

A channel can be provided which extends through the thermal storage element and is adapted to guide a fluid, in particular water and/or steam, through the energy storage device, in order to transfer thermal energy from the thermal storage element to the fluid. The channel can also be referred to as a tubing. The material forming the channel is preferably electrically grounded.

According to the second inventive concept, an energy storage device is provided with at least one energy storage unit, in particular with exactly energy storage unit, comprising
  a thermal storage element made of a solid material, for storing thermal energy;
  an electrical heating device for heating the thermal storage element by means of electric energy; and
  an electric insulation in the form of a gas insulation, in order to electrically insulate the electrical heating device from the thermal storage element.

The energy storage device according to this second inventive concept is independent and represents an independent invention with respect to the energy storage device according to the first inventive concept as indicated further above. In most applications, it is preferred to use either the energy storage device according to the first inventive concept or the energy storage device according to the second inventive concept. However, for certain applications, it is also conceivable to combine these two energy storage devices by e.g. providing a single energy storage device that has at least one energy storage unit as indicated with respect to the first inventive concept, i.e. in which an electric current is generated directly in the solid material of the thermal storage element, and that has at least one energy storage unit as indicated with respect to the second inventive concept, i.e. in which an electric gas insulation is provided to electrically insulate the electrical heating device from the thermal storage element.

In the case of the energy storage device according to this second inventive concept, the electrical heating device preferably comprises a resistive heater that is arranged near or adjacent to the thermal storage element. Thus, in this case, the thermal storage element is indirectly heated by the electrical heating device, meaning that the heat is transferred by thermal conduction and/or radiation from the electrical heating device to the thermal storage element. The resistive heater is preferably made of a metallic material, but can also be made from an organic material. The electric insulation serves to electrically separate the electrical heating device from the thermal storage element, i.e. to prevent short circuits in the thermal storage element, in particular if the thermal storage element has a certain electric conductivity.

The use of a thermal storage element that is made from a material with a certain electric conductivity is particularly preferred with respect to the energy storage device according to this second inventive concept. Preferably, the thermal storage element has an electric resistivity of less than $10^{-4}$ $\Omega$m. The thermal storage element can for example be made of a metal, such as iron, or contain graphite.

Due to the electric conductivity of the thermal storage element, the electric insulation is necessary. The electric insulation should not only protect the thermal storage element from short circuits, but at the same time should also have a good thermal conductivity to ensure charging efficiency. These contradictory and therefore challenging requirements can be met by providing the electric insulation in the form of a gas insulation. Preferred gases are air, nitrogen, argon and $CO_2$.

The electrical heating device preferably comprises a resistive heater in the form of for example a resistive stripe, i.e. an electrically resistive element having a flat configuration. In order to spatially adapt the heat transfer to the thermal storage element during the charging process, the resistive stripe can have a varying cross-sectional area and/or a varying surface coverage along a surface of the thermal storage element. Alternatively or in addition, the cross-sectional area and/or a surface coverage can also vary along of the longitudinal direction of the resistive stripe. The embodiment of the resistive stripe with varying cross-sectional area and/or varying surface coverage is particularly advantageous, if the thermal storage element usually exhibits a certain temperature stratification caused by the discharging process.

In certain embodiments, it is also possible that the electrical heating device comprises a resistive rod or tube that is inserted in a hole provided in the thermal storage element. In the space surrounding the rod or tube, the hole is in this case preferably filled with the insulating gas. The hole is preferably a through-hole, but can also be a blind hole.

Irrespectively, whether it is designed according to the first or second inventive concept, the energy storage device preferably comprises an interface unit for connecting the electrical heating device of at least one of the energy storage unit(s) to an electric supply. The interface unit preferably comprises a cooling device.

The idea to provide an interface unit with a cooling device is generally independent of the design of the energy storage device, provided it has at least one storage unit with a thermal storage element made of a solid material, for storing thermal energy, and an electrical heating device for heating the thermal storage element by means of electric energy. While the idea of the interface unit with the cooling device is preferably applied in combination with an energy storage device designed according to the first or to the second inventive concept, it is also conceivable to apply this idea in combination with an energy storage device that is not designed according to the first or second inventive concept. Thus, the idea of the interface unit with the cooling device represents an independent invention with respect to the energy storage devices according to the first and the second inventive concepts as indicated further above.

The electrical heating device can comprise an induction coil for inducing an electric current directly in the solid material of the thermal storage element or in another element arranged in proximity or adjacent of the thermal storage element. Alternatively or additionally, the electrical heating device can comprise a resistive heater arranged in proximity or adjacent of the thermal storage element, in order to transfer the thermal energy to the thermal storage element by means of thermal conduction and/or radiation.

Independent of its design, at least a part of the electrical heating device is usually arranged in close proximity of the thermal storage element and, as a result, can become hot during and/or after the charging process. Preferably, the respective part is even arranged within a thermal insulation that surrounds the thermal storage element. The parts of the electric supply outside of the thermal insulation, however, are to be protected from overheating. This can be achieved by providing the above-mentioned interface unit with a cooling device. The cooling device serves to cool e.g. the connection between the electrical heating device and the electric supply within the interface unit, such that no thermal energy is transferred from the thermal storage element and/or the electrical heating device to the electric supply, i.e. the electric supply is not overheated. The cooling device can particularly be in the form of a blower.

In order to keep the thermal losses at a minimum, the interface unit is preferably adapted to mechanically, i.e. physically, disconnect the electrical heating device from the electric supply. By mechanically disconnecting the electrical heating device from the electric supply, no thermal energy can be transferred from the thermal storage element and/or the electrical heating device to the electric supply anymore. Additionally, no cooling is necessary anymore, if the electrical heating device is mechanically disconnected from the electric supply. Thus, the interface unit is preferably adapted to automatically disconnect the electrical heating device from the electric supply, more preferably to automatically disconnect the electrical heating device from the electric supply, as soon as the charging process ends. Advantageously, the interface unit is also adapted to stop the operation of the cooling device, if the electrical heating device is disconnected from the electric supply. In order to reduce thermal losses by the cooling process, the interface unit preferably comprises a housing or box in which the electrical heating device can be connected to the electric supply. Furthermore, the interface unit is preferably not only adapted to disconnect, in particular automatically disconnect, the electrical heating device from the electric supply, but also to re-connect, in particular automatically re-connect, the electrical heating device with the electric supply. In the disconnected state, the respective connection elements of the electrical heating device and of the electric supply are preferably arranged distantly to each other.

The energy storage device, independently whether it is designed according to the first or second inventive concept, preferably also comprises a channel which is adapted to guide a fluid through the energy storage device, in order to transfer thermal energy from the thermal storage element to the fluid. The channel preferably extends along or through the thermal storage element. The fluid can in particular be water and/or steam. Preferably, the fluid is water, which is converted to steam, in particular superheated steam, by the transfer of the thermal energy. In the following, the transfer of the thermal energy from the thermal storage element to the fluid is referred to as the discharging process.

A channel is here regarded as a laterally closed or open conduit for guiding the fluid. The channel usually has an inlet and an outlet arranged at the respective ends of the channel. If the channel is laterally closed, the inlet and the outlet are the only access to the channel. Thus, the channel is circumferentially surrounded by a delimiting material and can form e.g. a circular cross-section. In certain embodiments, the channel, which can also be referred to as a tubing, can be formed, i.e. delimited, by the material of the thermal storage element. Alternatively, the channel can also be provided in a steam generation block and be delimited by the material of the steam generation block. It is also possible that a pipe or a tube is provided that delimits the channel. Even if not preferred in all embodiments, it is generally conceivable that the pipe or tube extends through the thermal storage element or the steam generation block.

Similarly as the charging process, the discharging of the energy storage device can be carried out in a particularly efficient way: The fluid which is used for e.g. driving a turbine can be guided directly through the channel or tubing, in order to be heated up. By means of the turbine, the stored thermal energy can for example be converted into mechanical work and back into electric energy. In this process, preferably no intermediate medium is used for transferring the thermal energy from the thermal storage element to the medium that drives the turbine. The medium that drives the turbine is preferably the fluid which is guided through the channel of the energy storage device.

A further advantage of the energy storage devices according the first and second inventive concepts is the use of a solid material for the storage of thermal energy. Solid materials usually allow the storage of large amounts of thermal energy within a comparatively small space. Thus, the use of a solid material for the storage of thermal energy enables the energy storage device to be designed in a particularly compact way.

The thermal storage element is an element that is particularly designed for the purpose of storing thermal energy. Thus, the storage of thermal energy is usually the main and preferably only purpose of the thermal storage element.

If the channel extends through the thermal storage element, it is preferably completely surrounded by the solid material of one or several thermal storage elements (e.g. if more than one energy storage units are present) along a major part of its entire longitudinal extension. The channel is completely surrounded along preferably at least 60%, more preferably at least 80% of its longitudinal length by the solid material of one or several thermal storage elements.

The fluid is preferably water and/or steam. The use of water and/or steam as the fluid is particularly safe and allows to directly drive a steam turbine. In a particularly preferred embodiment, the fluid entering the energy storage device and in particular the at least one energy storage unit is water in its liquid phase and the fluid exiting the energy storage device and in particular the at least one energy storage unit is water in its gaseous phase, i.e. steam. Thus, the energy storage device and in particular the at least one energy storage unit is preferably adapted to boil water and more preferably to boil water and to further heat the obtained steam. In other words, fluid in the form of liquid water preferably enters the energy storage device and in particular the at least one energy storage unit and fluid in the form of superheated steam preferably leaves the energy storage device and in particular the at least one energy storage unit. Such an embodiment of the energy storage device is particularly well suited in combination with a steam turbine for converting the stored thermal energy into mechanical energy, which can be further converted into electrical energy.

Particularly in the energy storage device according to the first inventive concept, the solid material of the thermal storage element is preferably a material with not only good thermal storage capacities, but also with a certain electric conductivity, in order to allow a heating by means of an electric current within the material.

The energy storage device according to both inventive concepts can comprise a single energy storage unit only. Preferred, however, is an embodiment in which the energy storage device comprises a plurality of energy storage units. Particularly preferred is an embodiment with a plurality of energy storage units such that the energy storage device is scalable to the needs of a user, by applying a respective number of energy storage units. In an embodiment with a plurality of energy storage units, the thermal storage element of each energy storage unit preferably comprises at least one flat surface, such that the thermal storage elements of different energy storage units are adapted to abut each other with their respective flat surfaces. The thermal storage element can particularly have an overall cuboid, in particular plate-like shape. The abutment of the plurality of thermal storage elements does not necessarily be direct, but can also be indirect, e.g. with an electrical heating element and/or a steam generation block arranged in-between. In order to be adapted to be arranged between the flat surfaces of at least two adjacent thermal storage elements, the electrical heating device and/or the steam generation block have an overall flat configuration. A modular and easily scalable configuration of the energy storage device can be achieved in this way.

In another, also preferred embodiment, each of the one or several energy storage units can have an overall tube-like shape, with a central tube forming the channel and with the thermal storage element surrounding the tube concentrically. With such a design, the at least one energy storage unit can easily be produced and can be arranged on-site in a space-saving manner in many cases.

In a particularly preferred embodiment, each of the thermal storage elements has an overall cuboid shape and each electrical heating device has an overall flat configuration. In this embodiment, steam generation blocks are additionally provided which each have an overall cuboid configuration and comprise a channel for guiding a fluid. The electrical heating devices of this embodiment are adapted to be arranged between the thermal storage elements, and the steam generation blocks are adapted to be arranged between the thermal storage elements, such that the energy storage device can be modularly designed with an arbitrary number of thermal storage elements, electrical heating devices and steam generation blocks. Due to the modularity of this design, the energy storage device, which can be designed according to the first or to the second inventive concept, can be easily adapted to the present needs, in particular with regard to the thermal storage capacity.

If the channel is formed by an electrically conducting material, such as a metal, and extends through the thermal storage element designed according to the first inventive concept, the energy storage device preferably additionally comprises an electric insulation, in order to electrically insulate the channel from the thermal storage element. Since a metal is preferably used to form the channel, in order to achieve a high thermal conductivity, the material forming the channel usually has an electric conductivity that is much higher than the one of the thermal storage material. By providing an electric insulation around the channel, the occurrence of an electric bypass current through the material forming the channel can be avoided during the heating of the thermal storage element. The material of the electric insulation should have a high electric resistivity, i.e. at least higher than the one of the solid material of the thermal storage element. Additionally, the electric insulation should have good thermal conductivity, in order to enable an efficient transfer of thermal energy from the thermal storage element to the fluid in the channel. The electric insulation is preferably in the form of a thin layer that completely surrounds the channel within the thermal storage element.

In preferred embodiments, irrespective whether they are designed according to the first or to the second inventive concept, the channel is arranged in a steam generation block that is adapted to be arranged directly adjacent to the thermal storage element and preferably has an overall cuboid, in particular plate-like configuration.

In other, also preferred embodiments, the channel can extend through the thermal storage element. The channel can particularly extend such through the thermal storage element, that the temperature distribution remains essentially homogeneous within the entire thermal storage element during the transfer of thermal energy from the thermal storage element to the fluid. This can be achieved for example, if the at least one energy storage unit is a multi-pass energy storage unit. A multi-pass energy storage unit is an energy storage unit in which the channel does not extend in a straight line through the thermal storage element, but instead comprises at least one turn, meander, curve etc. such that at least one part of the solid material is able to transfer thermal energy to at least two different adjacent sections of the channel during the discharge process. A multi-pass energy storage unit has the advantage that the distribution of temperature within the thermal storage element remains more homogeneous during the discharge process. A more homogeneous temperature distribution means less thermal stresses and, as a result, a prolonged lifetime of the thermal storage element. In a multi-pass energy storage unit, the channel preferably has the form of a two- or three-dimensional, one- bi- or more-filar meander, spiral or snail.

The channel can also extend such through the thermal storage element, that a temperature stratification between an inlet and an outlet of the channel evolves during the transfer of thermal energy from the thermal storage element to the fluid. The temperature stratification is preferably such that the temperature of the thermal storage element continuously increases along a direction from the inlet to the outlet of the channel. Such a temperature stratification can be achieved for example, if the at least one energy storage unit is a single-pass energy storage unit. A single-pass energy storage unit is an energy storage unit in which the channel extends in essentially a single straight line through the thermal storage element, such that each part of the solid material is able to transfer thermal energy to only one adjacent section of the channel during the discharge process. As a result, the distribution of the temperature within the solid material of the thermal storage element during the discharge process is not homogeneous. In the region of the outlet of the channel, the thermal storage element usually has a higher temperature than in the region of the inlet of the channel, i.e. there is a pronounced temperature gradient within the thermal storage element. Any energy storage unit with temperature stratification including the single-pass energy storage unit is particularly well suited for controlling the temperature of the fluid at the outlet of the channel.

The energy storage device can comprise an energy storage unit, in particular an energy storage unit with stratified temperature distribution, such as e.g. a single-pass energy storage unit, which is arranged in series with and downstream of at least one further energy storage unit. The at least one further energy storage unit can be an energy storage unit with homogeneous or stratified temperature distribution, such as e.g. a single- or multi-pass energy storage unit. Preferably, the at least two energy storage units which are arranged in series are heated to different temperatures. The arrangement of an energy storage unit in series and downstream of a further energy storage unit is particularly advantageous, in order to control the temperature of the fluid during the discharge process.

Alternatively or in addition, an energy storage unit, in particular an energy storage unit with homogeneous temperature distribution, such as e.g. a multi-pass energy storage unit, can be arranged in parallel to at least one further energy storage unit. The at least one further energy storage unit can again be an energy storage unit with homogeneous or stratified temperature distribution, such as e.g. a single- or multi-pass energy storage unit. Preferably, the at least two energy storage units which are arranged in parallel are heated to different temperatures. The parallel arrangement of an energy storage unit allows a regulation of the fluid streams through the energy storage units e.g. by means of pumps and/or valves, in order to obtain the desired fluid temperature after mixing the two fluid streams.

The arrangements of the energy storage units in series and in parallel, as described above, can of course be combined arbitrarily with each other, in order to achieve a particularly well adjustable, precise and/or stable temperature control of the fluid during the discharge process. The temperatures of the thermal storage elements which are arranged in series or in parallel, preferably differ by at least 50° C. and even more preferably by at least 100° C.

The energy storage device according to any one of the two inventive concepts preferably additionally comprises a turbine for converting, by means of the heated fluid, the thermal energy stored in the thermal storage element into electric energy. The turbine is preferably a steam turbine, but can also be e.g. a gas turbine. In the case of a steam turbine, the fluid is preferably water. In the case of a gas turbine, the fluid is preferably air.

The invention is also directed to a method for storing energy by means of an energy storage device, in particular by means of one of the energy storage devices as described above, with at least one energy storage unit which comprises a thermal storage element made of a solid material, with a channel which is adapted to guide a fluid through the energy storage device, in order to transfer thermal energy from the thermal storage element to the fluid, and with an electrical heating device for heating the thermal storage element by means of electric energy. The method comprises the steps of heating the thermal storage element, e.g. by means of a resistive heater or by means of generating an electric current within the solid material of the thermal storage element, using the electrical heating device; and guiding a fluid, in particular water and/or steam, through the channel, which can particularly be a part of a steam generation block, in order to transfer thermal energy from the thermal storage element to the fluid, i.e. to heat the fluid.

The channel, which can also be referred to as a tubing, can particularly extend along or through the thermal storage element.

The heated fluid is preferably used to drive a turbine, in particular a steam turbine.

Before heating the thermal storage element, the channel is advantageously purged by means of a gas, in particular by means of air. Purging of the channel by means of a gas allows removing possible remains of fluid or of other substances from the channel. The presence of fluid and/or other substances within the channel during the heating of the thermal storage element is usually undesirable, because these substances can uncontrollably evaporate during the charging process and even damage the channel. An overheating of the channel due to a non-homogeneous temperature distribution can be prevented by means of the described purging process. The purging is preferably carried out by means of low velocity air.

In a preferred embodiment, at least two energy storage units are arranged in parallel to each other and are heated to different temperatures by means of the respective electrical heating devices, wherein the fluid is guided in at least two fluid streams through the respective channels, and wherein the at least two fluid streams are regulated in such a way that, after mixing the two fluid streams with each other, a resulting predetermined goal pressure, mass flow and/or temperature of the fluid is achieved which preferably lies between the temperatures of the at least two energy storage units. Two parallel fluid streams through energy storage units having thermal storage elements on different temperatures allow a particularly well adjustable, precise and/or stable temperature control of the fluid during the discharge process. The control of mass flow and pressure is preferably provided by one or several pumps and/or by one or several valves arranged on the cold end of the system, i.e. upstream of the energy storage units and in particular of the thermal storage elements. The system preferably does not include any pumps and/or valves at the hot end.

In a further preferred embodiment, at least two energy storage units are arranged in series, with a second energy storage unit being arranged downstream of a first energy storage unit, wherein the first energy storage unit is heated to a different temperature than the second energy storage unit by means of the respective electrical heating device, and wherein the temperature of the second energy storage unit corresponds to a predetermined goal temperature of the fluid. The predetermined goal temperature thus is usually the temperature of the fluid when leaving the most downstream energy storage unit of the at least two energy storage units that are arranged in series. Preferably, the predetermined goal temperature is the temperature of the fluid when leaving the energy storage device and is in particular preferably the temperature of the fluid when entering a turbine. The control of mass flow and pressure is preferably provided by one or several pumps and/or by one or several valves arranged on the cold end of the system, i.e. upstream of the energy storage units and in particular of the thermal storage elements. The system does not include any pumps and/or valves at the hot end.

SHORT DESCRIPTION OF THE FIGURES

Figure 2:
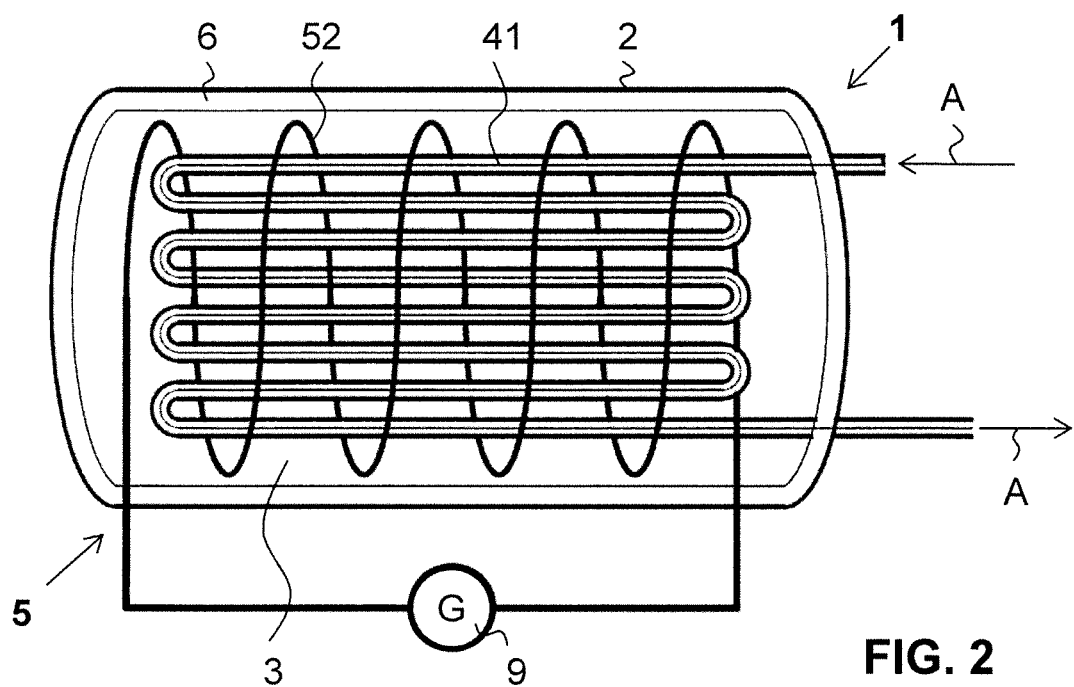
Figure 5:
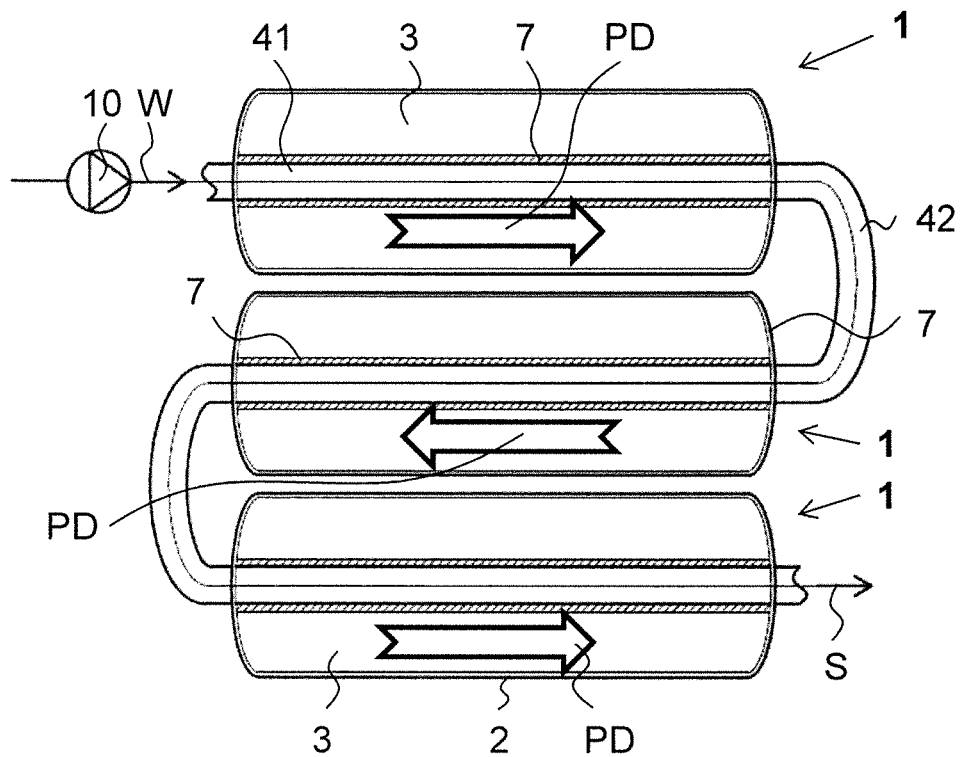
Figure 6:
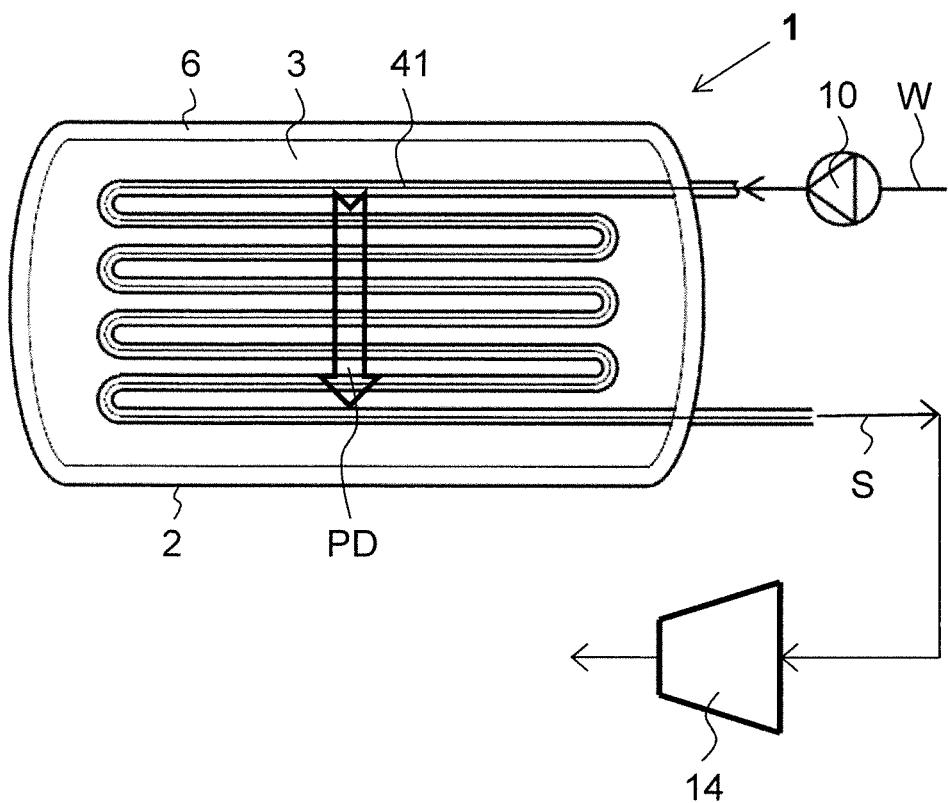
Figure 7:
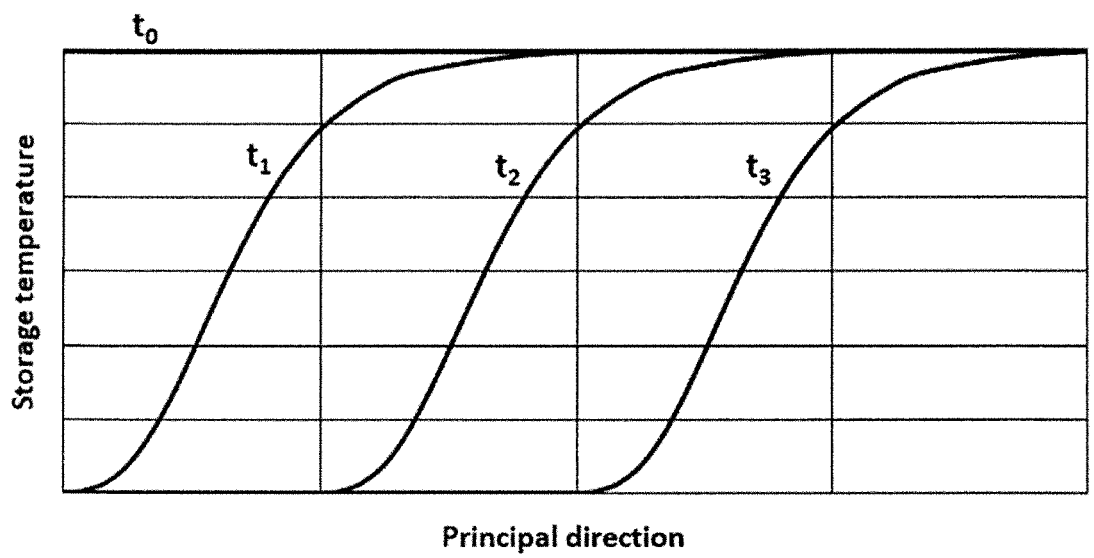
Figure 8:
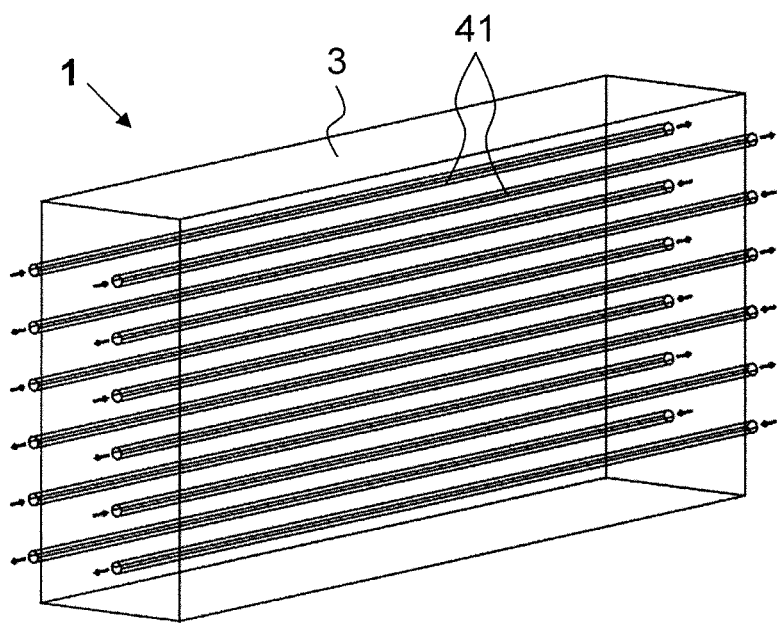
Figure 9:
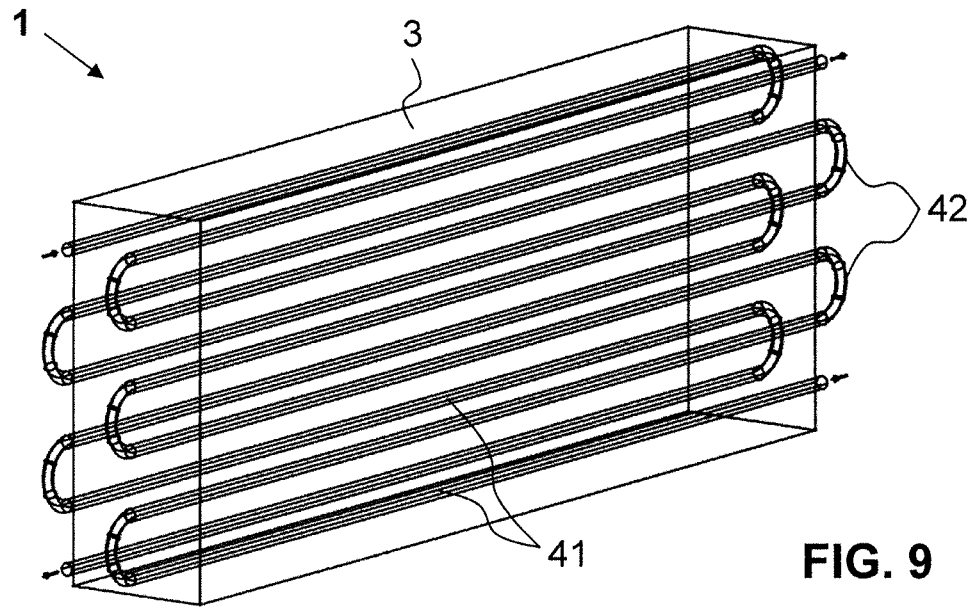
Figure 10:
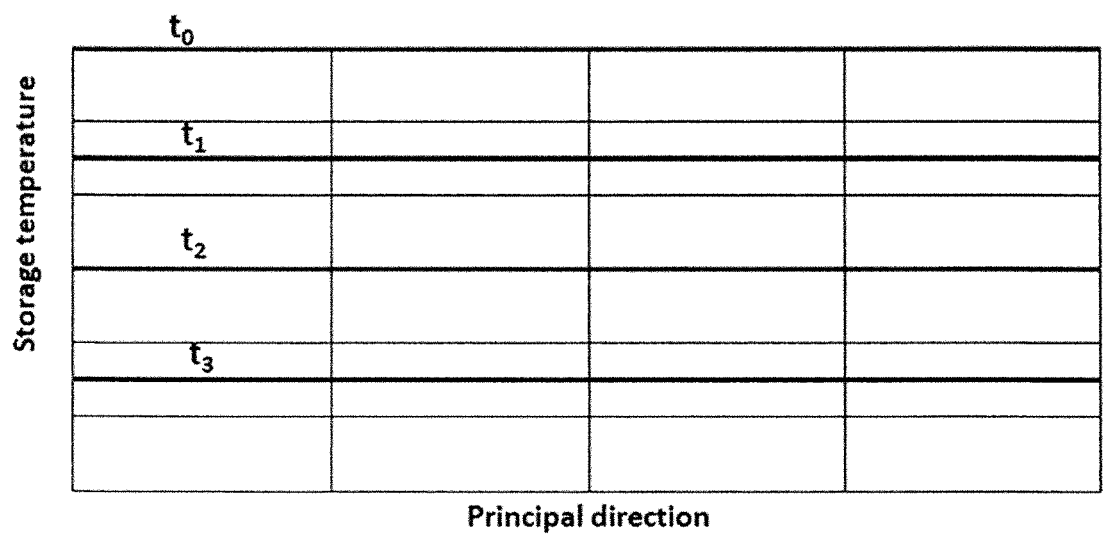
Figure 11:
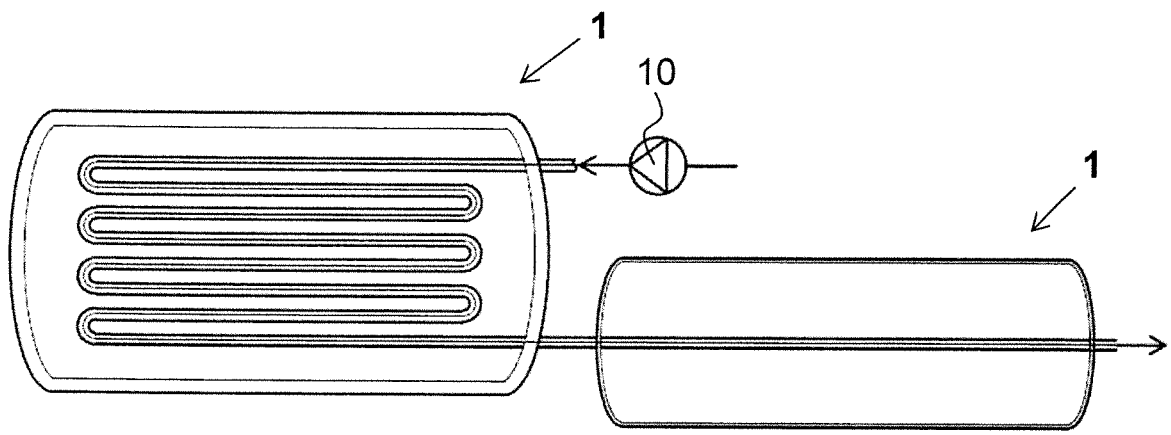
Figure 12:
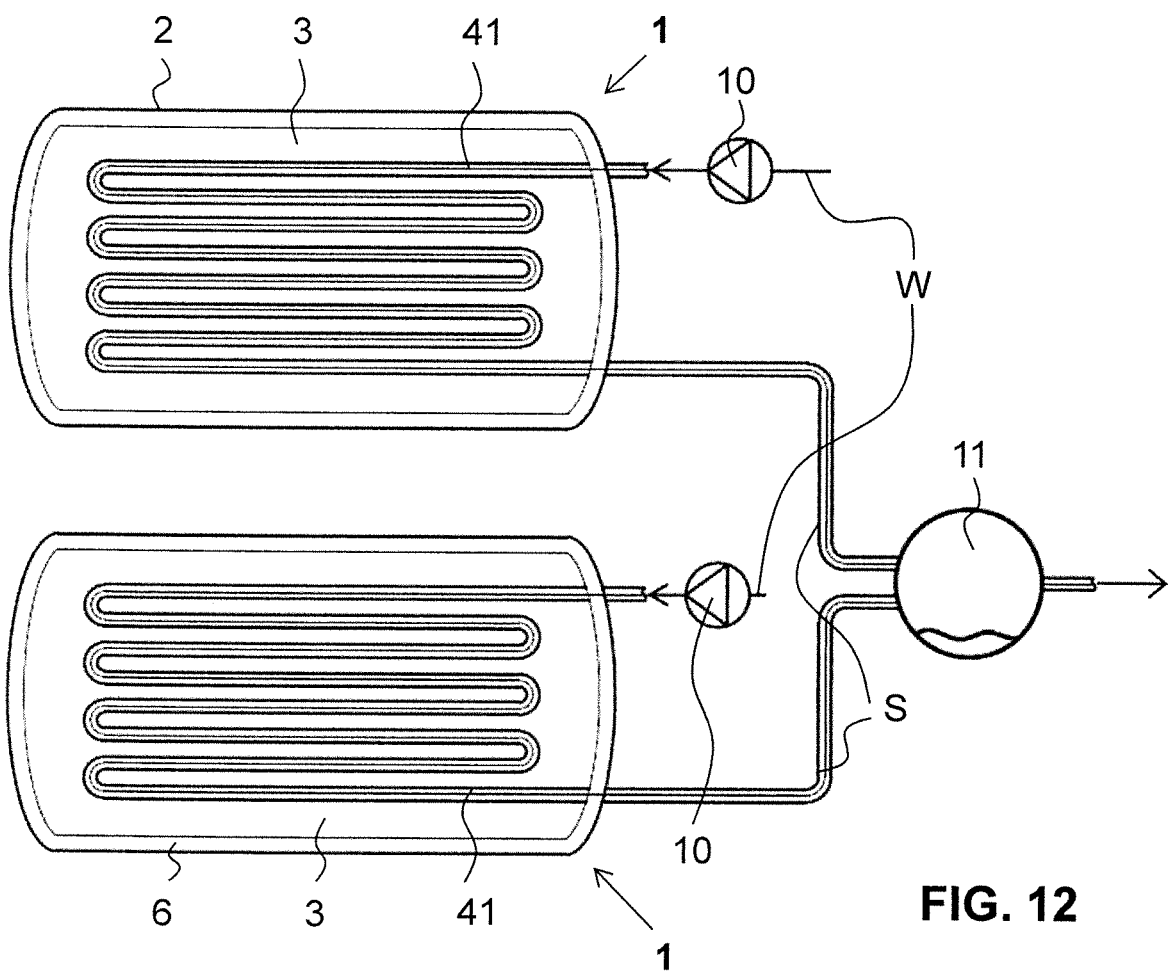
Figure 13:
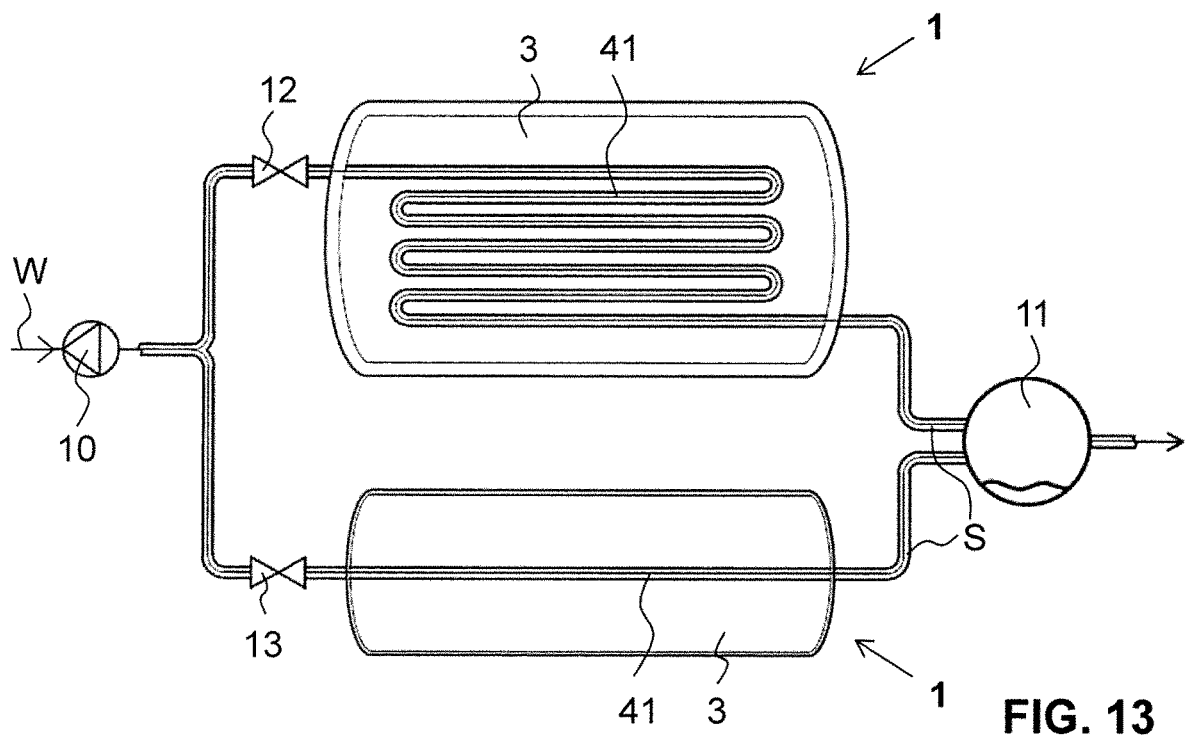
Figure 14:
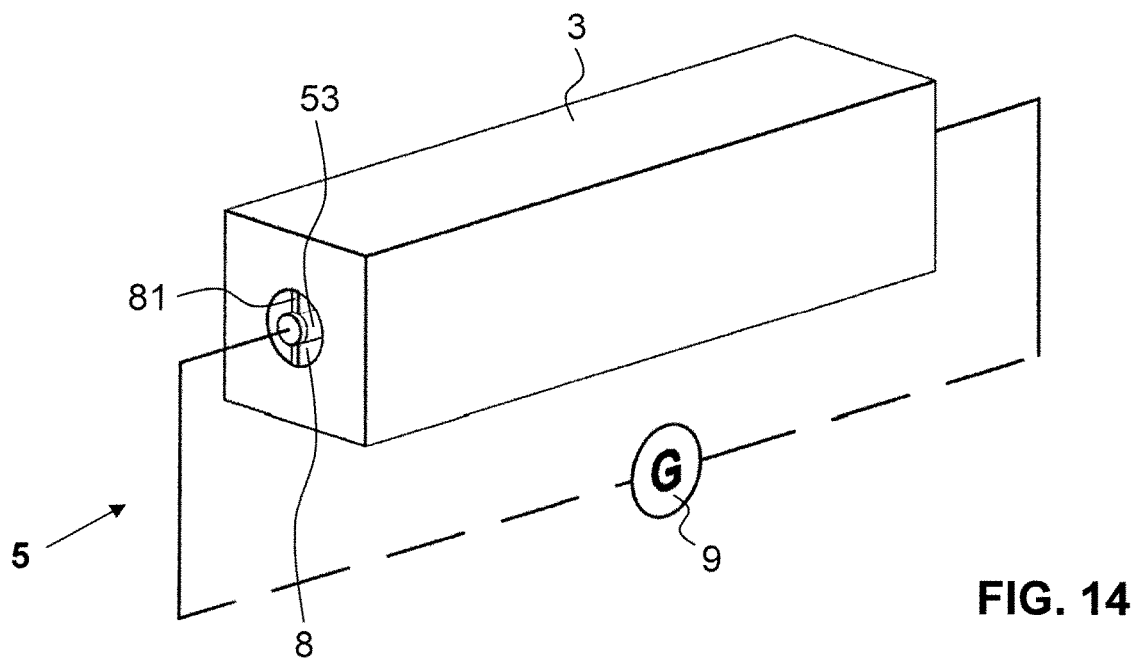
Figure 15:
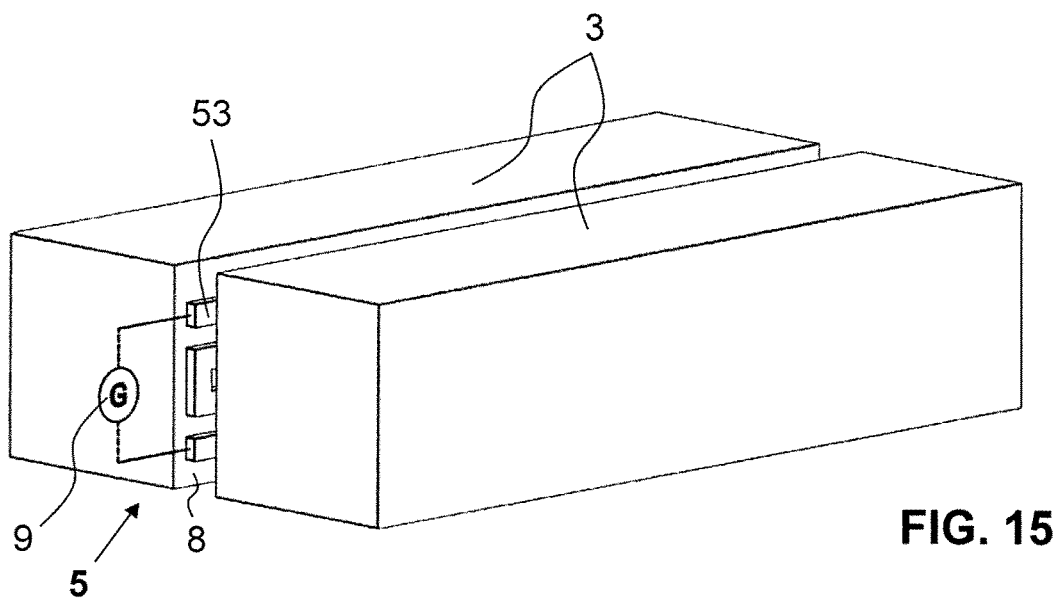
Figure 16:
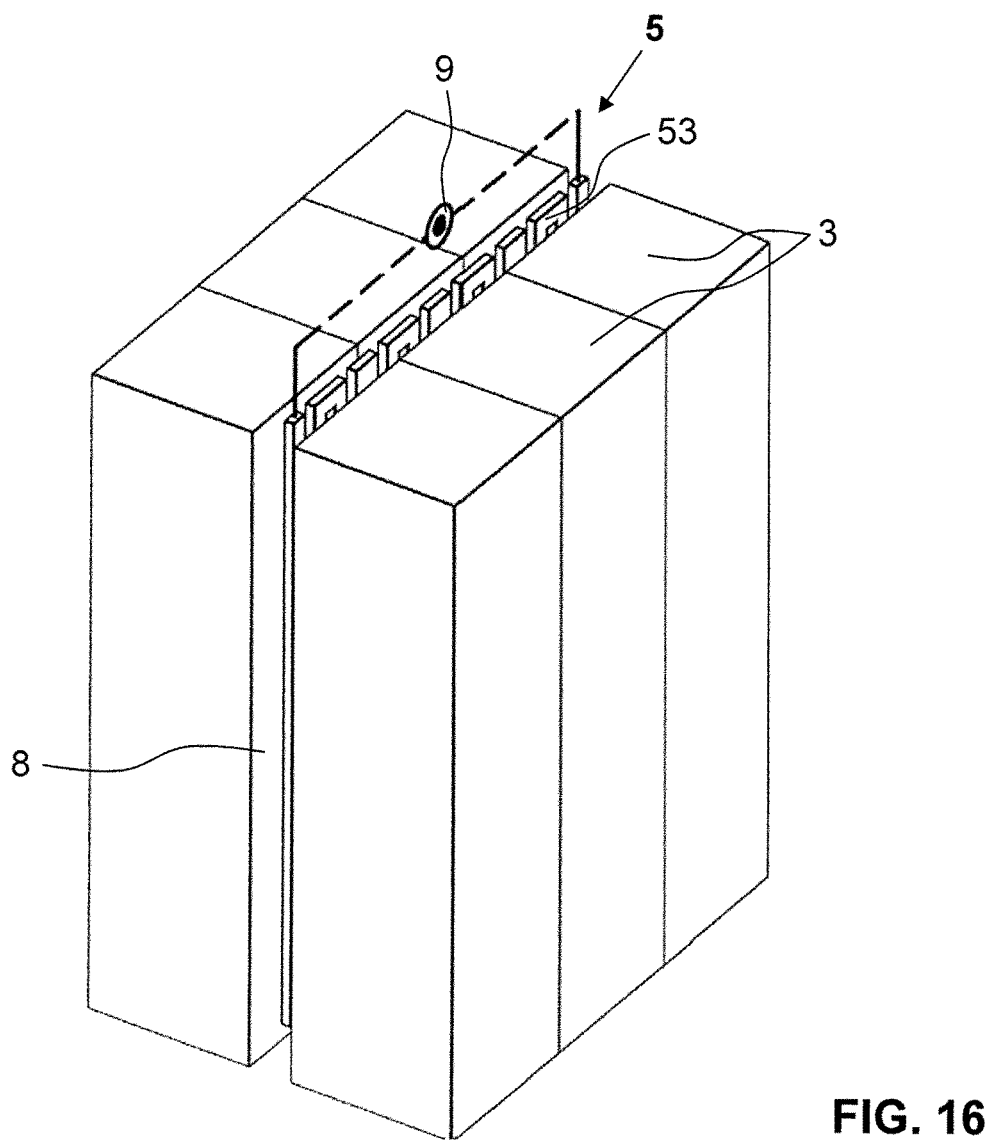
Figure 17:
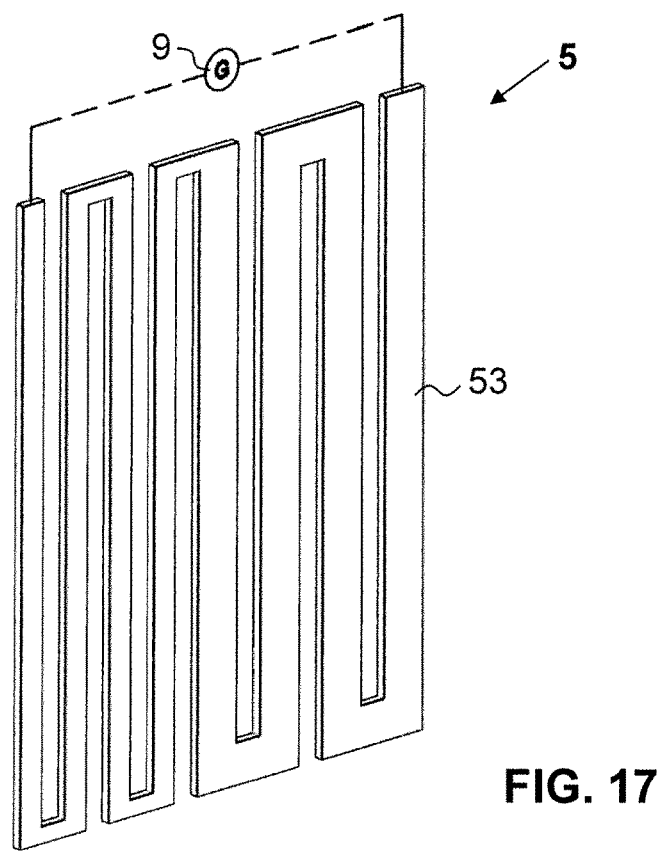
Figure 18:
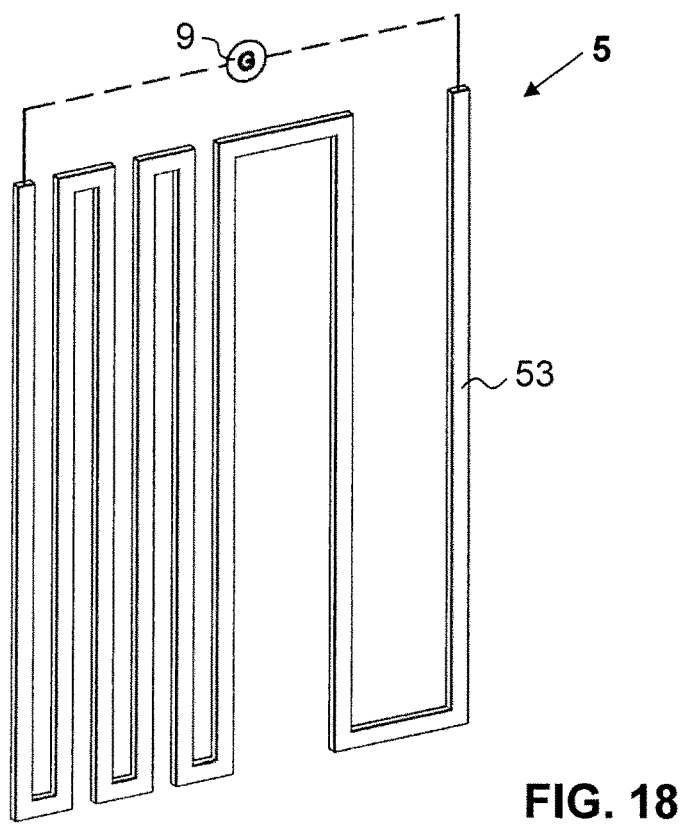
Figure 19:
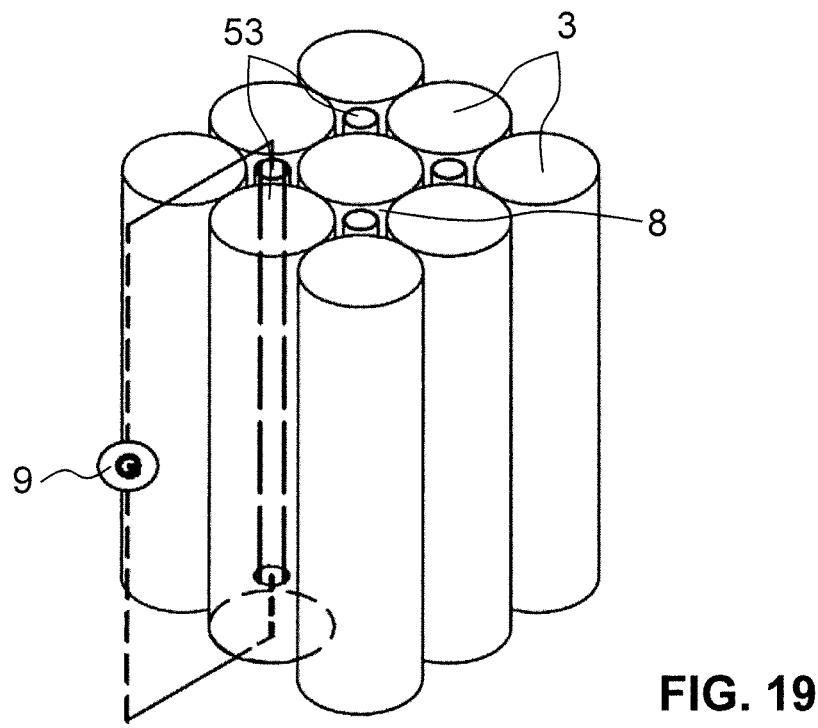
Figure 20A:
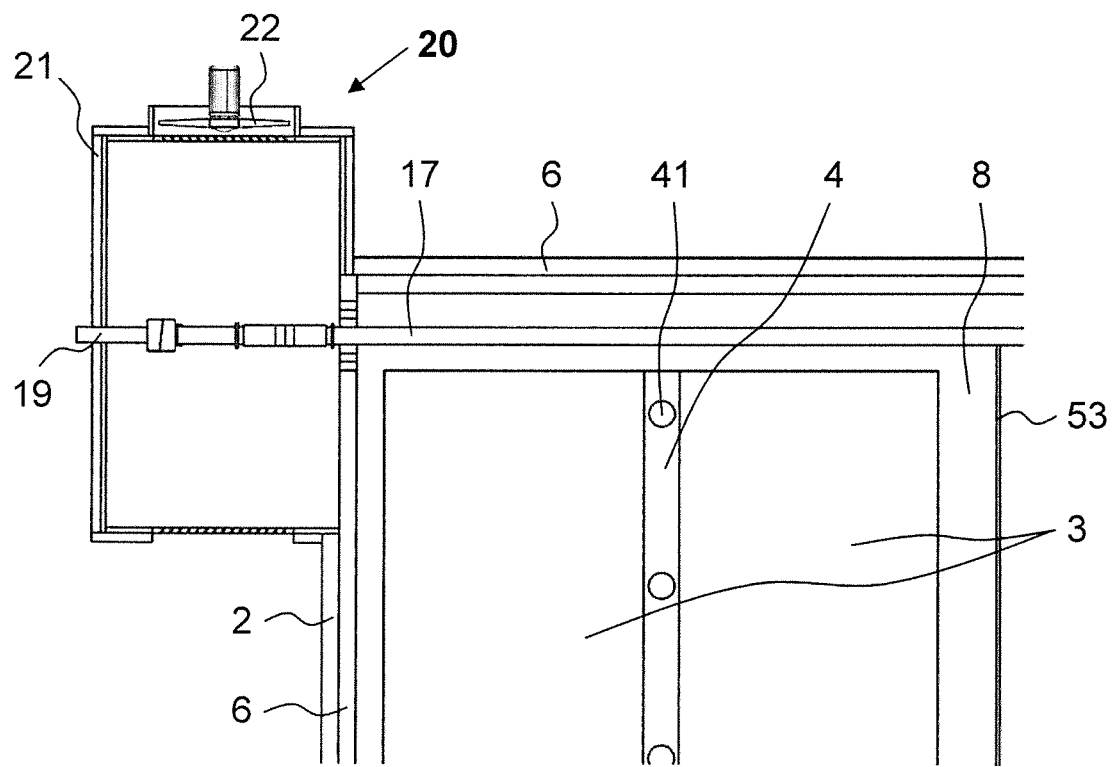
Figure 20B:
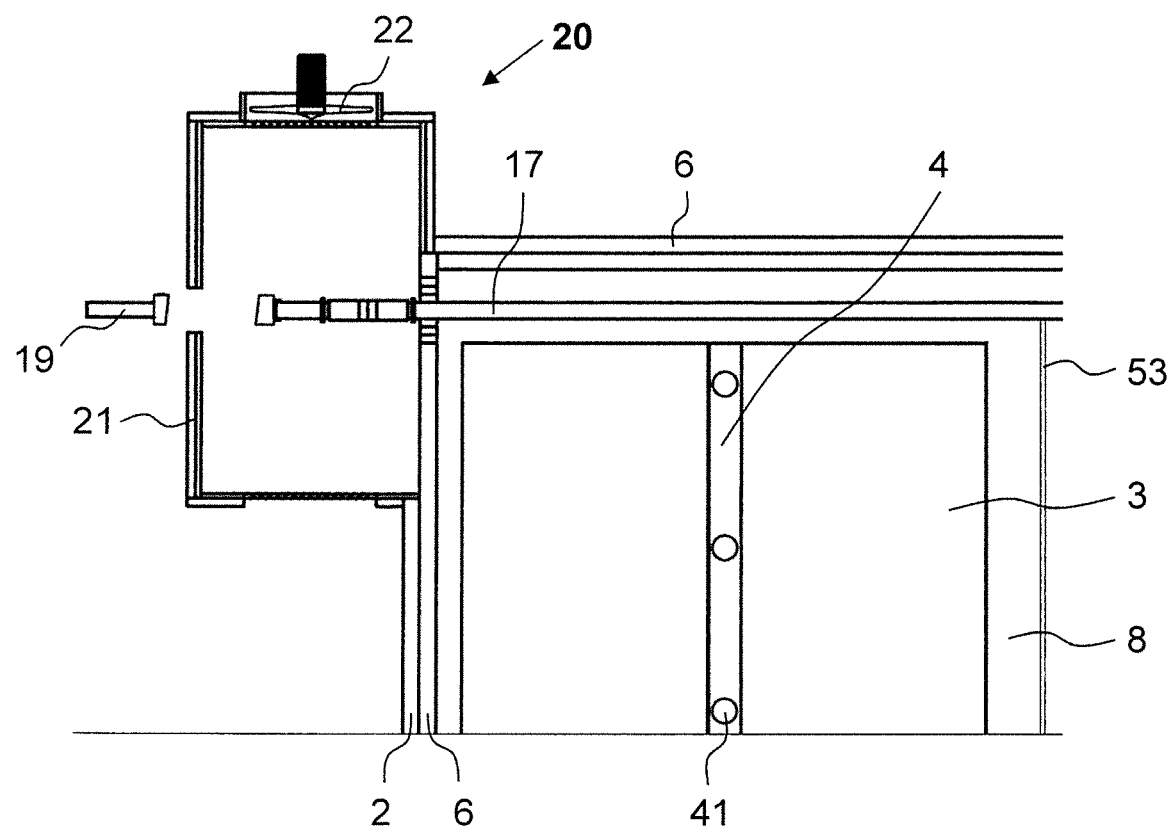
Figure 21:
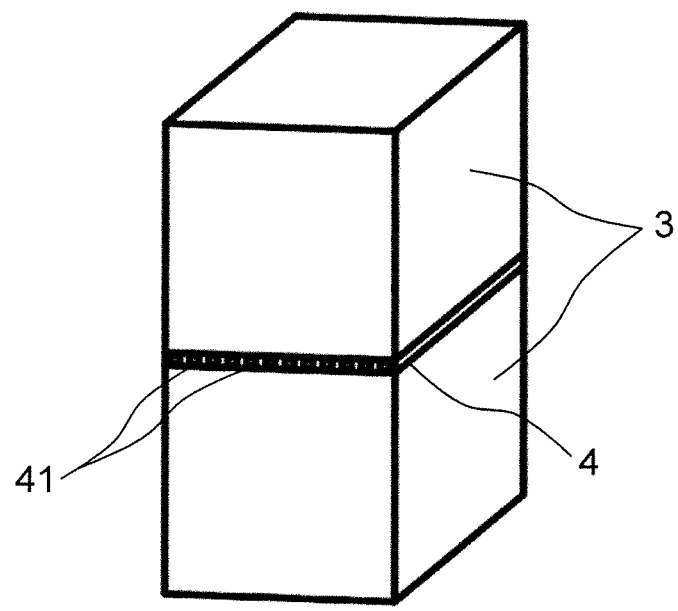
Figure 22:
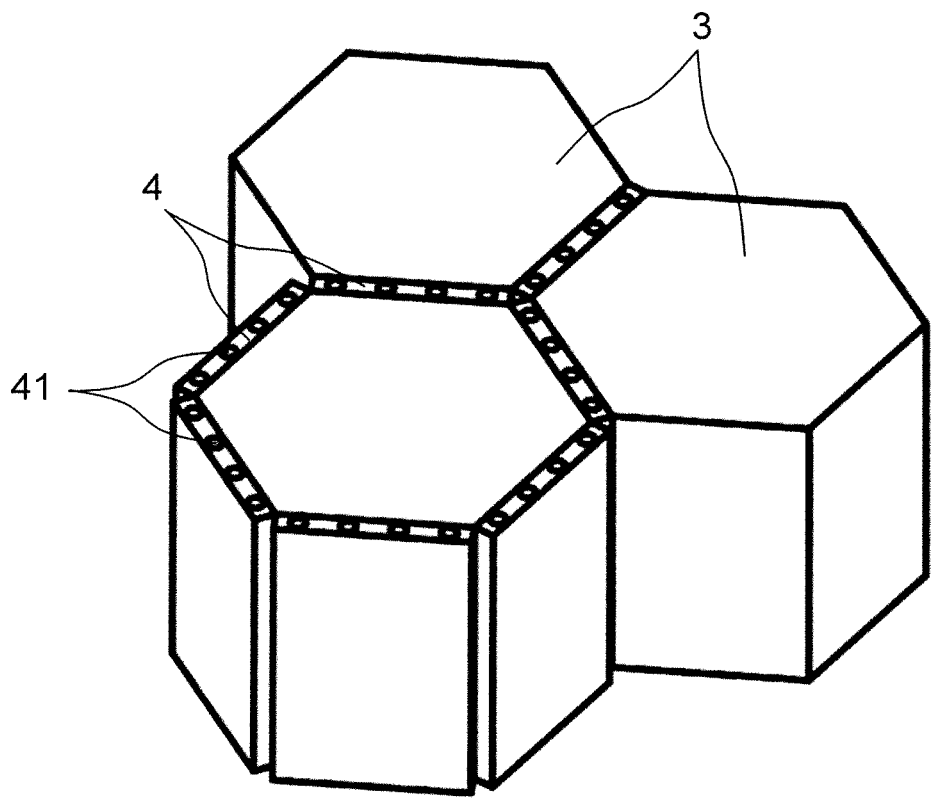
Figure 23:
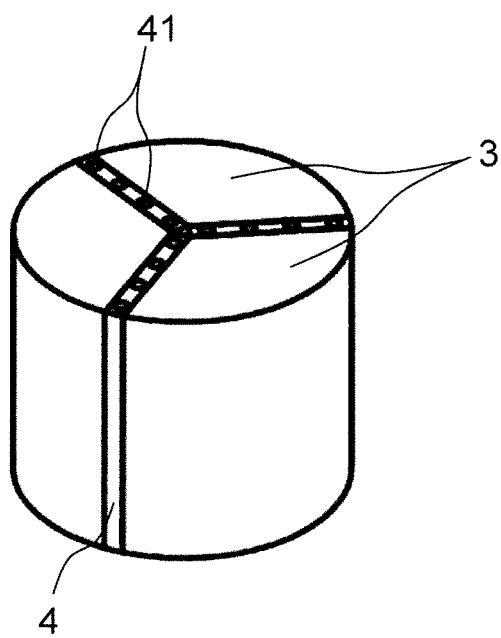
Figure 24:
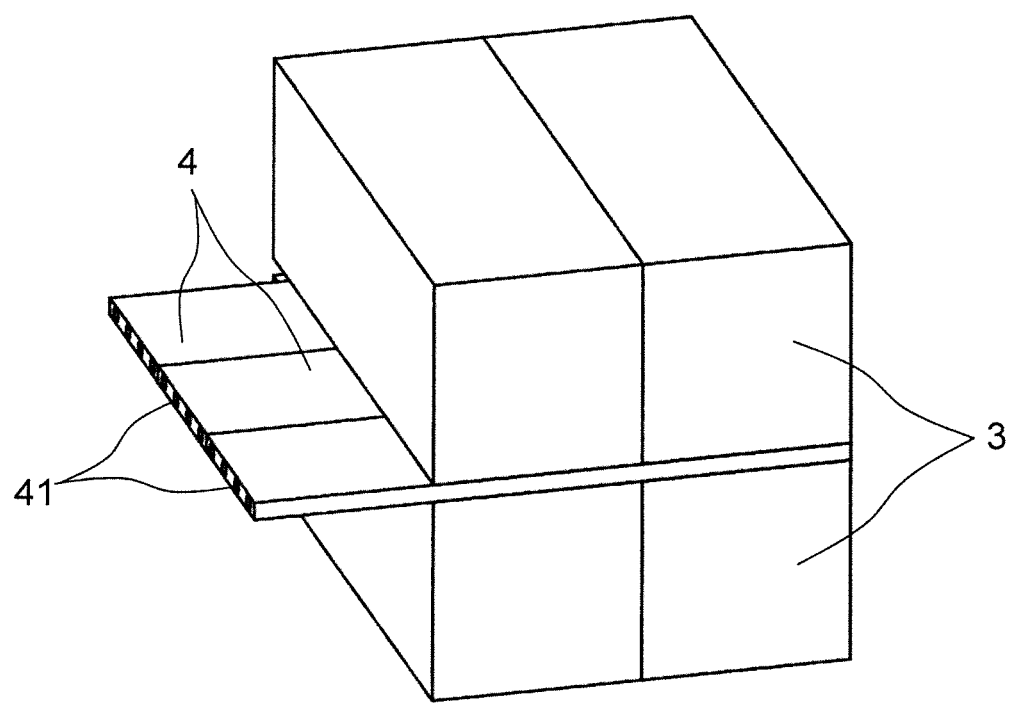
Figure 25:
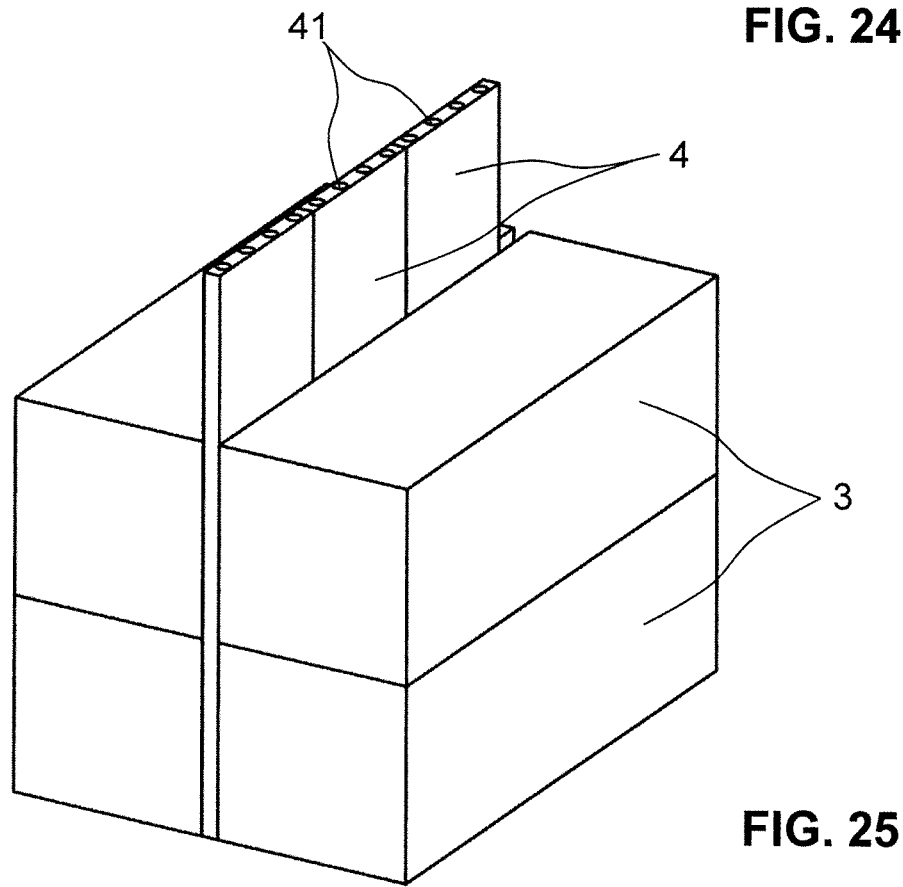
Figure 26:
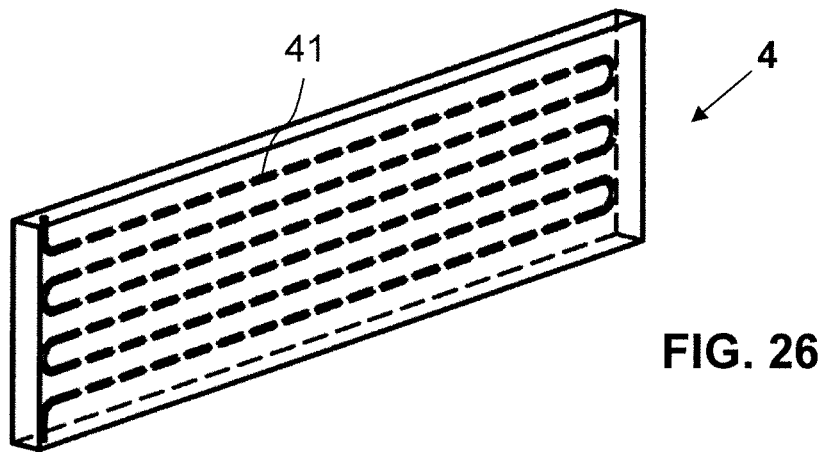
Figure 27:
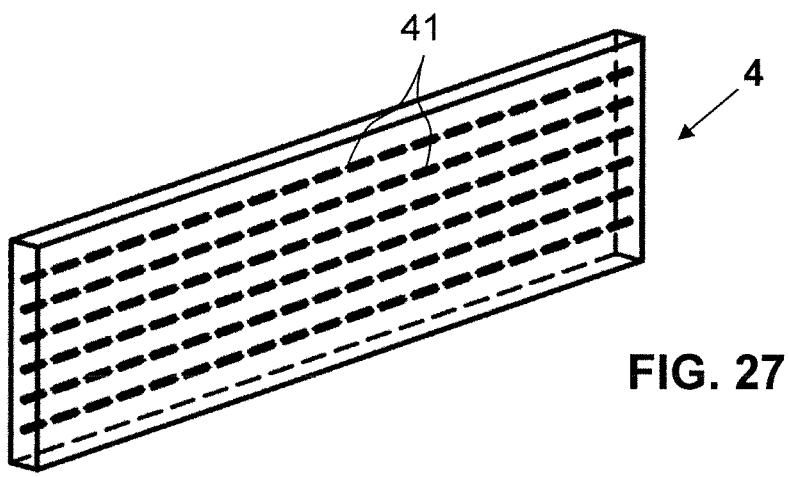
Figure 28:
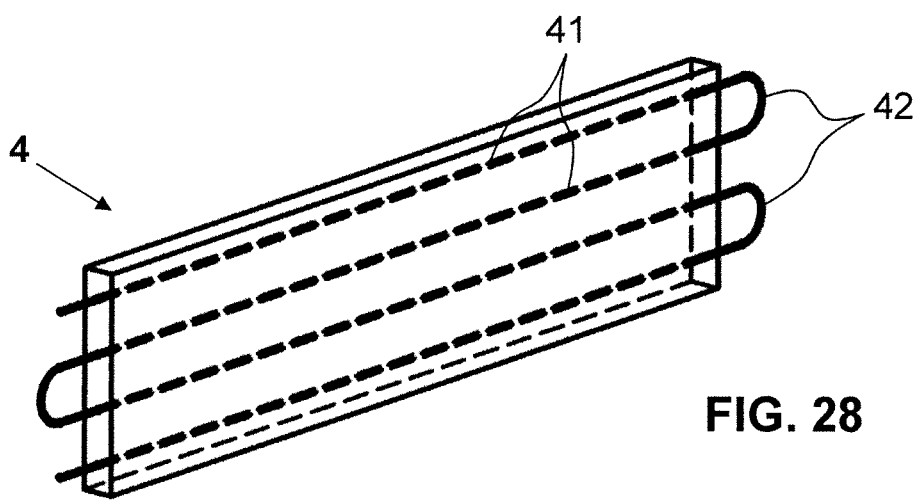
Figure 29:
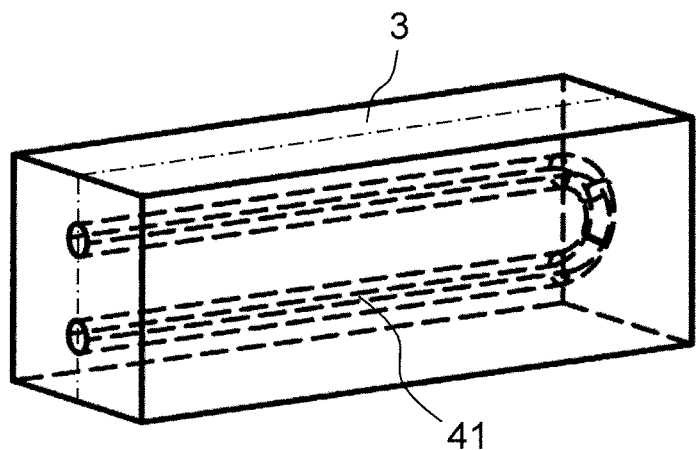
Figure 30:
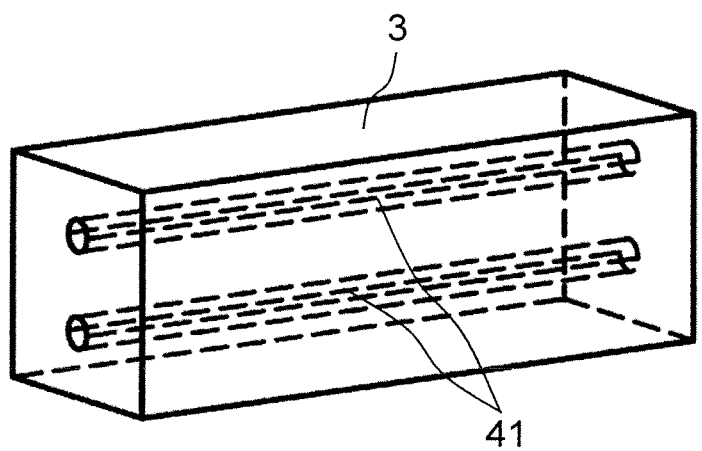
Figure 31:
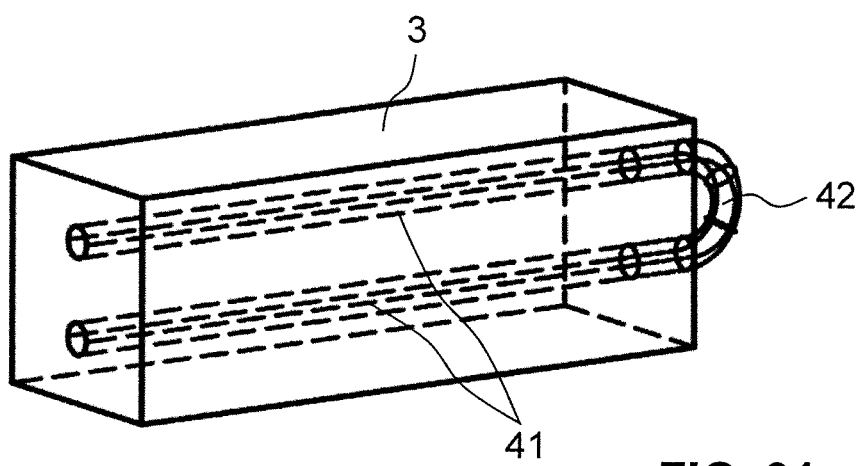
Figure 32:
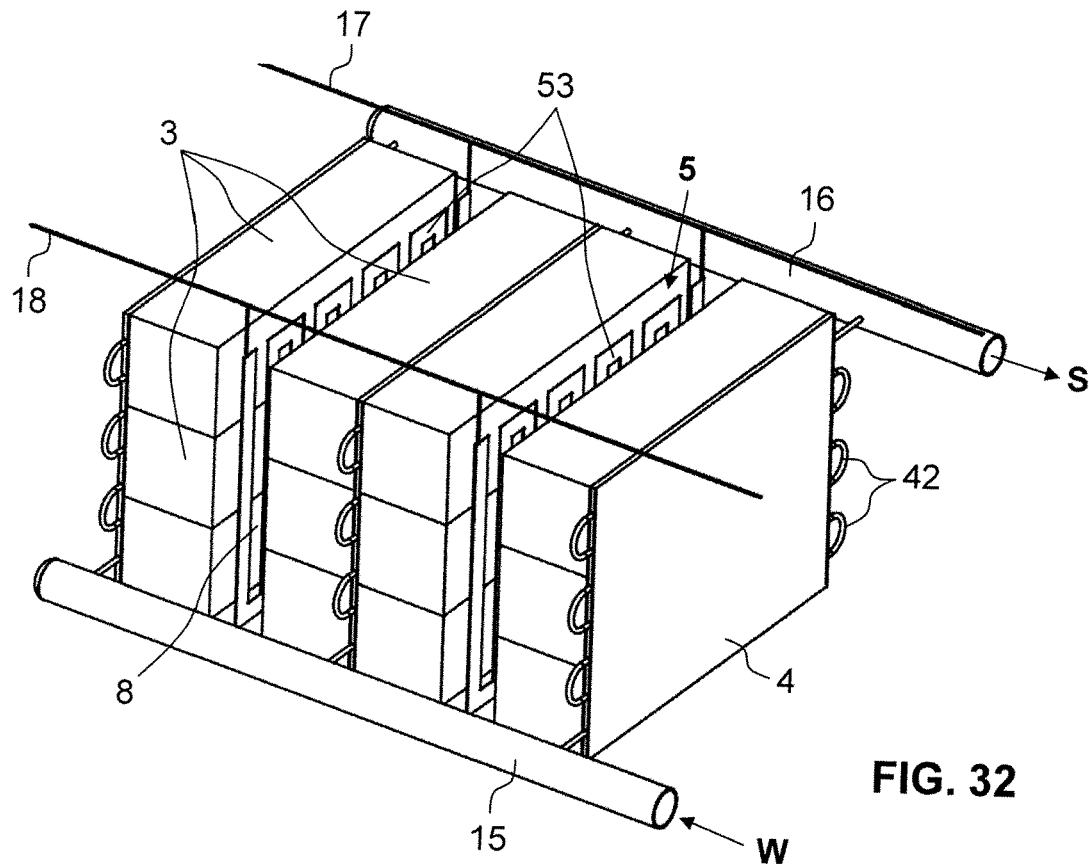
Figure 33:
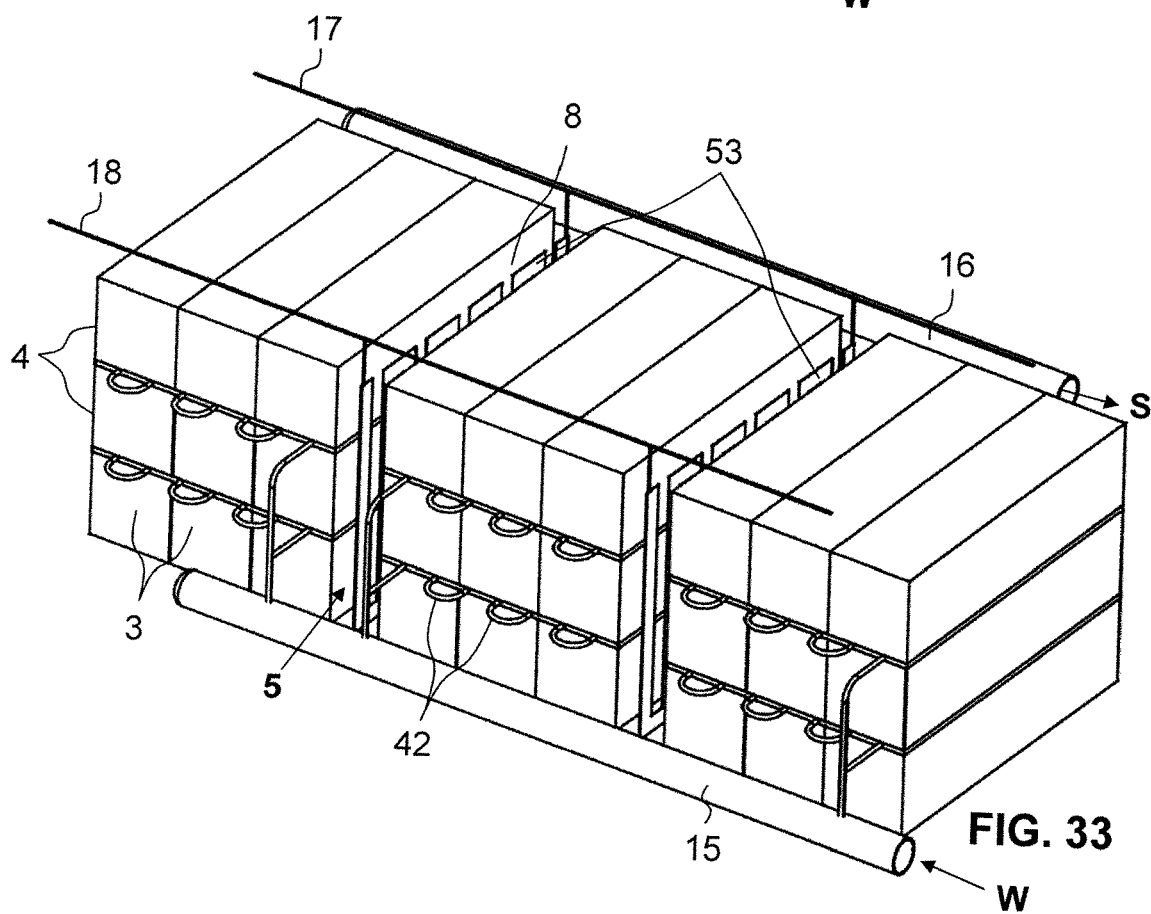

Preferred embodiments of the invention are described in the following with reference to the drawings, which only serve for illustration purposes, but have no limiting effects. In the drawings it is shown:

FIG. 1 a schematic view of a (multi-pass) energy storage unit of an energy storage device according to an inventive embodiment, with an electrical heating device having contact electrodes;

FIG. 2 a schematic view of a (multi-pass) energy storage unit of an energy storage device according to another inventive embodiment, with an electrical heating device having an induction coil;

FIG. 3a a schematic view of a (single-pass) energy storage unit of an energy storage device according to a further inventive embodiment, with an electric insulation between the channel and the thermal storage element;

FIG. 3b a cross-sectional view along plane III-III of the energy storage unit of FIG. 3a;

FIG. 4 a schematic view of the (single-pass) energy storage unit of the energy storage device of FIG. 2 and of a water pump for pumping water through the energy storage device;

FIG. 5 a schematic view of an energy storage device according to a further inventive embodiment, comprising three single-pass energy storage units arranged in series;

FIG. 6 a schematic view of an energy storage device according to a further inventive embodiment, comprising a multi-pass energy storage unit, a water pump and a steam turbine;

FIG. 7 a graph illustrating the variation of storage temperature along the principal heat propagation direction of the thermal storage element and over time, in case of a thermal storage element with temperature stratification;

FIG. 8 a perspective view of a (multi-pass) energy storage unit of an inventive energy storage device, with straight channels extending through the thermal storage element;

FIG. 9 a perspective view of a (multi-pass) energy storage unit of an inventive energy storage device, with straight channels extending through the thermal storage element, the channels being connected by connection elements to form two serpentine channels;

FIG. 10 a graph illustrating the variation of storage temperature along the principal heat propagation direction of the thermal storage element and over time, in case of a thermal storage element with homogeneous temperature distribution;

FIG. 11 a schematic view of an energy storage device according to a further inventive embodiment, comprising a multi- and a single-pass energy storage unit arranged in series;

FIG. 12 a schematic view of an energy storage device according to a further inventive embodiment, comprising two multi-pass energy storage units arranged in parallel;

FIG. 13 a schematic view of an energy storage device according to a further inventive embodiment, comprising a multi and a single-pass energy storage unit arranged in parallel;

FIG. 14 a schematic perspective view of an energy storage unit according to a further inventive embodiment, comprising an electric gas insulation between the electrical heating device and the thermal storage element;

FIG. 15 a schematic perspective view of an energy storage unit according to another inventive embodiment, with an electrical heating device arranged between two thermal storage elements;

FIG. 16 a schematic perspective view of an energy storage unit according to yet another inventive embodiment, with an electrical heating device arranged between two stacks of thermal storage elements;

FIG. 17 a schematic perspective view of a variant of an electrical heating device for an inventive energy storage device;

FIG. 18 a schematic perspective view of another variant of an electrical heating device for an inventive energy storage device;

FIG. 19 a schematic perspective view of an energy storage unit according to another inventive embodiment, with a plurality of cylindrical resistive heaters arranged between a plurality of cylindrical thermal storage elements;

FIG. 20a a schematic cross-sectional view of an inventive energy storage device, with an interface unit for connecting and disconnecting the electrical heating device to and from an electric supply;

FIG. 20b the energy storage device of FIG. 20a, in the disconnected state of the interface unit;

FIG. 21 a schematic perspective view of two cuboid thermal storage elements and of a plate-shaped steam generation block stacked on each other;

FIG. 22 a schematic perspective view of a plurality of hexagonal thermal storage elements and of plate-shaped steam generation blocks abutting each other;

FIG. 23 a schematic perspective view of three thermal storage elements, each having a cross-section shaped as a circular sector, and of plate-shaped steam generation blocks abutting each other;

FIG. 24 a schematic perspective view of a plurality of cuboid thermal storage elements and of a plurality of plate-shaped steam generation blocks stacked on each other;

FIG. 25 a schematic perspective view of a plurality of cuboid thermal storage elements and of a plurality of plate-shaped steam generation blocks stacked on each other, in another configuration compared to the FIG. 24;

FIG. 26 a schematic perspective view of a steam generation block of an inventive energy storage device, with a serpentine channel;

FIG. 27 a schematic perspective view of a steam generation block of an inventive energy storage device, with a plurality of straight channels inside the block;

FIG. 28 a schematic perspective view of a steam generation block of an inventive energy storage device, with a plurality of straight channels inside the block interconnected by tubes outside the block to form a serpentine channel;

FIG. 29 a schematic perspective view of a thermal storage block with integrated serpentine channel;

FIG. 30 a schematic perspective view of a thermal storage block with integrated straight channels;

FIG. 31 a schematic perspective view of a thermal storage block with integrated straight channels interconnected by tubes outside the block to form a serpentine channel;

FIG. 32 a schematic perspective view of an inventive energy storage device having a modular configuration with a plurality of stacked thermal storage elements, electrical heating devices and steam generation blocks; and FIG. 33 a schematic perspective view of an inventive energy storage device having a modular configuration similar as in FIG. 32, but with another arrangement and with an increased thermal storage capacity.

DESCRIPTION OF PREFERRED EMBODIMENTS

In the following, features having the same or a similar design and/or the same or a similar function are referred to by means of the same reference numerals.

A first embodiment of an energy storage device according to the first inventive concept is shown in FIG. 1. The energy storage device comprises an energy storage unit which here has the form of a multi-pass energy storage unit 1. The multi-pass energy storage unit 1 comprises a thermal storage element 3, a channel 41 which can also be referred to as a tubing, an electrical heating device 5, a thermal insulation 6 and a housing 2.

The thermal storage element 3 is made of a solid material, i.e. a material that is always in its solid state both during the charging and the discharging process. Preferably, the thermal storage element has an electric resistivity of at least $10^{-4}$ $\Omega$m and not more than 1 $\Omega$m.

The channel 41 has an inlet for introducing a fluid in the form of liquid water W and has an outlet, through which the heated water leaves the multi-pass energy storage unit 1 in the form of steam S, in particular of superheated steam S.

The thermal insulation 6 is provided directly and preferably on the entire outer surface of the thermal storage element 3, in order to prevent dissipation of the stored thermal energy to the outside. The housing 2 serves to receive and hold the thermal storage element 3 and the thermal insulation 6.

The electrical heating device 5 comprises two contact electrodes 51 which are attached directly to the solid material of the thermal storage element 3. The contact electrodes 51 are attached to two surfaces of the thermal storage element 3 which are arranged on opposite sides of the thermal storage element 3. The electrical heating device 5 is connected to an electric energy supply 9 (source of electric current G), which can for example be a solar or wind power system and/or the public electric power supply. During times of high supply, the electrical heating device 5 heats the thermal storage element 3 by means of applying a voltage difference on the contact electrodes 51, which leads to the generation of an electric current within the solid material of the thermal storage element 3. The electric current in turn leads to resistance heating of the thermal storage element 3. Thus, electric energy from the electric energy supply 9 is transferred in a very direct and, thus, efficient way into thermal energy stored in the thermal storage element 3.

In an alternative embodiment, the electrical heating device 5 can also comprise a connection to the channel 41 (see dashed line in FIG. 1), in order to electrically ground the channel 41.

During times of high energy demand, the thermal energy stored in the thermal storage element 3 can be transferred back into electric energy and/or mechanical energy. For this purpose, liquid water W is introduced by e.g. a pump via an inlet into the channel 41 and is guided through the channel 41 and, thus, the thermal storage element 3 to an outlet of the channel 41. On its way through the channel 41, thermal energy is transferred from the thermal storage element 3 to the water which, as a result, is heated up and evaporated into steam S. The steam S is further heated, i.e. superheated, on its way towards the outlet of the channel 41.

A turbine, in particular a steam turbine 14 (see FIG. 6), can be connected to the outlet of the channel 41. The superheated steam S drives the steam turbine 14, in order to transfer thermal energy back into electric energy and/or into mechanical energy. The steam turbine 14 can have several low- and high-pressure sections and/or comprise several low- and high-pressure turbines, as is well known to the skilled person. In the steam turbine 14, the steam S is cooled down. A thermal expansion valve can additionally be present, in order to transfer the already cooled steam S back into its liquid phase. The liquid water W can then be introduced again into the channel 41. Thus, the energy storage device preferably comprises a closed circle for circulating the water during the discharge process. In other alternative embodiments, an open circle can be provided.

The second embodiment of an energy storage device according to the first inventive concept as shown in FIG. 2 differs from the one of FIG. 1 by the design of the electrical heating device 5. Instead of generating an electric current within the thermal storage element 3 by means of a pair of contact electrodes, an induction coil 52 is used here to induce an electric current within the solid material of the thermal storage element 3. The induction coil 52 comprises a plurality of windings that are preferably wound around the thermal storage element 3, in order to induce the electric current as homogeneously as possible within the thermal storage element 3. The induction coil 52 also surrounds the channel 41.

The multi-pass energy storage unit 1 as shown in FIG. 2 is shown in a state before the charging process, i.e. in a non-heated state. In order to achieve a heating-up of the thermal storage element 3 which is as homogeneous as possible, the channel 41 is purged with low velocity air A. In doing so, possible rest water and/or remains of other undesired substances are removed from the channel 41 and, as a result, cannot cause an uncontrollable evaporation and an associated occurrence of overheated hot spots during the charging process anymore.

FIGS. 3a and 3b show a particularly preferred embodiment of an energy storage device according to the first inventive concept, in which a single-pass energy storage unit 1 having an overall tube-like shape is used. The production of single-pass energy storage units 2 in a tube-like shape has turned out to be particularly easy and, thus, cost-saving. Moreover, single-pass energy storage units 2 with such a shape can be arranged in a space-saving manner in many practical situations. The embodiment as shown in FIGS. 3a and 3b can also be applied with respect to an energy storage device according to the second inventive concept.

As can be seen from FIG. 3a, the channel 41 extends along an essentially straight line through the thermal storage element 3. Or in other words, the channel 41 extends centrally and in parallel to the longitudinal center axis of the thermal storage element through the latter. As a consequence, the temperature distribution within thermal storage element 3 during the discharging process becomes inhomogeneous, i.e. there is a significant gradient of the temperature, i.e. a temperature stratification, in the thermal storage element 3 from the inlet to the outlet of the channel 41. Such an inhomogeneous temperature distribution (or temperature stratification) can be advantageous, in order to maintain a constant temperature of the steam S at the outlet of the channel 41.

The energy storage device as shown in FIGS. 3a and 3b also comprises an electric insulation 7 for electrically insulate the channel 41, which is preferably a metallic channel, i.e. a channel formed by a metallic material, in all embodiments, from the thermal storage element 3. The electric insulation 7 serves to prevent a bypass current within the channel 41 during the charging process. The electric insulation 7 is preferably represented by a thin layer of an electrically insulating, but thermally conductive material. Possible examples for the material of the electric insulation 7 are nitrides like MN and SiN and carbides like SiC.

In the embodiment as shown in FIG. 4, the energy storage device additionally comprises a pump 10 for conveying the water W into and through the channel 41.

FIG. 5 shows an embodiment of an energy storage device in accordance with the first or second inventive concept, in which three single-pass energy storage units 2 are arranged in series. The advantage of the energy storage device of FIG. 5 is similar as the one of FIGS. 3a and 3b, i.e. a gradient in the temperature distribution from the inlet to the outlet for controlling the outlet temperature of the steam S. In the embodiment of FIG. 5, the thermal stresses are reduced due to a separation into three single-pass energy storage units 2. The device of FIG. 5 also allows heating the thermal storage elements 3 of the different single-pass energy storage units 2 to different temperatures during the charging process.

FIG. 6 shows an embodiment with a single multi-pass energy storage unit 1. Water W is conveyed by a pump 10 in an open or closed circuit through the multi-pass energy storage unit 1 to a steam turbine 14, in order to drive the latter.

Independently of the type of energy storage unit, two discharge concepts can be realised:
Discharge of thermal storage with temperature stratification.
Discharge of thermal storage with homogeneous temperature distribution.

The first concept is illustrated in FIGS. 4 to 6. In FIG. 4, a particularly simple system with a single thermal storage element 3 and a single straight channel 41 extending through the thermal storage element 3 is shown. The temperature distribution along a principal heat propagation direction PD of this thermal storage element 3 is shown for different times during the discharging process in FIG. 7. At the start of discharge ($t_0$), the temperature is constant along the thermal storage element 3, and during discharge the temperature of the storage material near the inlet of the channel 41 becomes significantly smaller than the one of the storage material near the outlet, i.e. there is a temperature stratification within the element along the principal direction PD. The temperature profile (average temperature in sections normal to flow direction) has a form of wave propagating along the direction of the flow. As can be noted in FIG. 7, the temperature at the outlet of the channel 41 remains constant for all times $t_0$ to $t_3$, meaning that the steam S leaves the thermal storage element 3 at a constant temperature at all times $t_0$ to $t_3$.

The same effect as illustrated in FIG. 7 can also be observed in each of the thermal storage elements 3 shown in FIG. 5 (preferably with different amplitudes) as well as along the principal direction PD (which is here oriented perpendicular to the flow direction) of the multi-pass energy storage unit 1 shown in FIG. 6.

To get a homogeneous temperature distribution, the system can have a plurality of straight channels that extend in parallel, but with opposite flow directions, i.e. with alternating inlet and outlets, as exemplary illustrated in FIG. 8. In the embodiment of FIG. 8, a single cuboid thermal storage element 3 has several straight channels 41, but the direction of flow opposite for each neighbouring channel 41. As a result, the temperature of thermal storage will change over time as shown in FIG. 10, i.e. it will essentially be homogeneous for the entire thermal storage element 3 and at all times $t_0$ to $t_3$.

If for the same thermal storage element 3 as shown in FIG. 8 a reduced number of inlets and outlets should be provided, curved connection elements 42 can be provided, in order to connect neighbouring inlets and outlets of the thermal storage element 3, as shown in the embodiment of FIG. 9. In this case, two serpentine channels 41 are provided, each of which has an inlet and an outlet. Again, a homogeneous temperature of the thermal storage element 3 can be achieved by alternating the flow direction in neighbouring sections of the channels 41.

Thus, discharge with temperature stratification may have a particular advantage for controlling the steam parameters. Discharge with homogeneous temperature distribution may have a particular advantage due to low temperature gradients within the thermal storage element 3. Particularly advantageous, however, is a combination of a plurality of such thermal storage elements 3, which can be of different or the same types, as is explained in the following with reference to FIGS. 11 to 13. The energy storage devices as shown in FIGS. 11 to 13 can be in accordance with any one of the first or second inventive concepts or even represent a combination thereof.

The energy storage devices as shown in FIGS. 11 to 13 in each case comprise a first energy storage unit 1 which is arranged in series (FIG. 11) or in parallel (FIGS. 12 and 13) with/to a second energy storage unit 1. In each of FIGS. 11 to 13, the first energy storage unit 1 is an energy storage unit 1 with homogeneous temperature distribution during the discharge process. In FIGS. 11 and 13, the second energy storage unit 1 is an energy storage unit 1 with temperature stratification between inlet and outlet during the discharge process. In FIG. 12, the second energy storage unit 1 is also an energy storage unit 1 with homogeneous temperature distribution during the discharge process. In the present exemplary embodiments of FIGS. 11 to 13, the energy storage units 1 with homogeneous temperature distribution are in each case realized by the exemplary provision of a multi-pass energy storage unit 1, and the energy storage units 1 with temperature stratification are in each case realized by the exemplary provision of a single-pass energy storage unit 1. In the following and with respect to FIGS. 11 to 13, the description is directed to single-pass and multi-pass energy storage units 1, but it is to be understood that these embodiments are only examples and that each single-pass energy storage unit 1 could generally be replaced by any other energy storage unit 1 with temperature stratification and that each multi-pass energy storage unit 1 could generally be replaced by any other energy storage unit 1 with homogeneous temperature distribution.

The single-pass energy storage unit 1 is arranged downstream of the multi-pass energy storage unit 1. This embodiment combines the above-discussed advantages of the homogeneous temperature distribution, i.e. here of the multi-pass energy storage unit 1, and of the temperature stratification, i.e. here of the single-pass energy storage unit 1. The thermal storage elements 3 of the multi-pass energy storage unit 1 and of the single-pass energy storage unit 1 are preferably heated to differing temperatures during the charging process. The temperature of the multi-pass energy storage unit 1 is preferably higher than the one of the single-pass energy storage unit 1.

For example, the multi-pass energy storage unit 1 shown in FIG. 11 can be charged to the maximal possible temperature of the respective solid material of its thermal storage element 3. The multi-pass energy storage unit 1 is then used as a preheater and evaporator and during a certain time as a superheater as well. The single-pass energy storage unit 1 can be charged to a temperature that equals the required temperature of the steam S. The single-pass energy storage unit 1 then has the function of a superheater. In an initial stage of the discharging process, the multi-pass energy storage unit 1 is fully charged and the output temperature of the steam at the outlet of the multi-pass energy storage unit 1 can exceed the required temperature of the steam S. In this situation, this overheated steam will further charge the single-pass energy storage unit 1 and will leave it at the required temperature. As soon as the temperature at the outlet of the multi-pass energy storage unit 1 drops below the required temperature for the steam S, the single-pass energy storage unit 1 starts to work as a superheater and maintains the required steam temperature.

Different thermal storage elements 3 can be made from different materials to optimise the overall costs of the energy storage device. In every case, the outlet element at the lowest temperature can e.g. be made from a cheaper material than the elements arranged upstream. It is also possible to e.g. arrange more than two elements (N elements) made from different materials and heated to different temperatures in a chain. The principal advantage of this storage method compared to other methods is that the temperature of the output steam S is self-controlled, i.e. no active control elements are required.

The pump 10 which maintains the required mass flow and pressure, is arranged on the cold side of the system. There is no need for hot valves and pumps or for any other expensive equipment on the hot end of the system.

FIG. 12 shows another inventive and preferred embodiment in which two multi-pass energy storage units 1 are arranged in parallel. The thermal storage elements 3 of the two multi-pass energy storage units 1 are heated to differing temperatures during the charging process. During the discharging process, water W is guided in two separate streams through the multi-pass energy storage units 1 and converted into steam S. The two streams of steam S are then united and mixed within a steam collector 11. Each of the streams is conveyed by a pump 10 arranged upstream, i.e. on the cold side, of the respective multi-pass energy storage unit 1. The resulting output temperature of the mixed steam S at the outlet of the steam collector 11 can be regulated by a corresponding control of the pumps 10. In this way, the output temperature of the mixed steam S can easily be adjusted to a temperature between the temperatures of the two multi-pass energy storage units 1. By arranging the pumps 10 upstream of the thermal storage elements 3, i.e. on the cold side of the system, the technical requirements for the pumps 10 are lowered. Instead of two pumps, it would of course also be possible to use e.g. a single pump 10 and two valves 12 and 13, as shown in the example of FIG. 13.

For example, the first multi-pass energy storage unit 1 as shown in FIG. 12 can be charged to the maximal possible temperature of the respective solid material of its thermal storage element 3. The second multi-pass energy storage element 1 can be charged to a temperature below the one of the first multi-pass energy storage unit 1. The streams of the water W are split between two multi-pass energy storage units 1 in such a way that the resulting mixture of steams at the output of the steam collector 11 has the required mass flow and the required temperature.

The embodiments of FIGS. 11 and 12 can of course be combined with each other, in order to achieve both a constant and well adjustable output temperature of the steam S, before guiding the steam S to e.g. a steam turbine.

In the embodiment of FIG. 13, a multi-pass energy storage unit 1 is arranged in parallel to a single-pass energy storage unit 1. Again, the two energy storage units 1 are preferably heated to differing temperatures during the heating process. The advantage of the multi-pass energy storage unit 1 is the combination of a high thermal capacity with a prolonged lifetime due to a homogeneous temperature distribution and less thermal stresses during the discharging process. The advantage of the single-pass energy storage unit 1 is its temperature stability. By adjusting the mass flow of the streams of water W through the two energy storage units 1, which is here done by means of valves 12 and 13 which are also arranged upstream of the energy storage units 1, i.e. on the cold side of the system, the temperature of the steam S at the output of the steam collector 11 can be adjusted and controlled. Thus, a high thermal storage capacity is combined with a particularly well adjustable and controllable output temperature of the steam S. A single pump 10 is used in this embodiment to convey both streams of water. Instead of a single pump and two valves, it would of course also be possible to use e.g. two pumps 10, as shown in the example of FIG. 12.

An embodiment of an energy storage device according to the second inventive concept is shown in FIG. 14. The energy storage device comprises thermal storage element 3 having a cuboid shape with a central through-hole extending along a straight line on the longitudinal centre axis through the entire thermal storage element 3. Arranged within the through-hole is a resistive heater 53 of the electrical heating device 5. In order to prevent possible short circuits within the solid material of the thermal storage element 3, an electric insulation 8 in the form of a gas insulation is provided that surrounds the resistive heater 53 along of its entire length. The material of the thermal storage element 3 has a preferred electric resistivity of less than $10^{-4}$ $\Omega$m. In order to hold the resistive heater 53 centered within the through-hole of the thermal storage element 3, spacers 81 made from a dielectric material are provided.

Thus, in the embodiment of FIG. 14, the space between the resistive heater 53 and the material of the thermal storage element 3 is filled by an electric insulation 8, which can be realized by a non-conductive gas (air, nitrogen, argon, or $CO_2$ etc.). The electric current (AC or DC) heats the resistive heater 53 and by radiation the heat is transferred to the inner surface of the thermal storage element 3 and then by conduction to the inside of the solide material of the thermal storage element 3. In the present embodiment, the resistive heater 53 has a circular cross-section.

FIG. 15 shows an embodiment in which the resistive heater 53 has a rectangular cross-section and is located between two cuboid thermal storage elements 3. The resistive heater 53 can be formed by a meander-shaped stripe as shown in FIG. 15. In other embodiments, the resistive heater 53 can also be formed by cylindrical elements such as pipes or by elements of any other shape.

Another arrangement with a resistive heater 53 between stacks of cuboid thermal storage elements 3 is shown in FIG. 16. Due to their flat surfaces, the thermal storage elements 3 can be arranged in such a way that they directly abut each other and that the heat transfer from the resistive heater 53 to the thermal storage elements 3 is optimal. In all arrangements, the resistive heater 53 can be supported by dielectric spacers, such as the spacers 81 shown in FIG. 14.

In certain embodiments, the resistive heater 53 can be formed by a resistive stripe with varying cross-sectional area and/or varying surface coverage along of its longitudinal direction, as shown in FIGS. 17 and 18. In the variant of FIG. 17, the cross-sectional area of the resistive heater 53 increases from left to right, which in use results in a generation of more heat at the left side than at the right side. Similarly, the surface coverage of the resistive heater 53 shown in FIG. 18 decreases from left to right, which in use likewise results in a generation of less heat towards the right side of the figure. The embodiments of the restive heaters 53 as shown in FIGS. 17 and 18 are particularly advantageous e.g. in combination with thermal storage elements 3 that have a temperature stratification during the discharge process as shown in FIG. 7. This variation of the temperature can be equalized during the charging process by means of a resistive heater 53 according to one of the variants as shown in FIGS. 17 and 18.

FIG. 19 shows an embodiment in which a plurality of cylindrical thermal storage elements 3 are provided. Between the thermal storage elements 3, cylindrical resistive heaters 53 are arranged and electrically insulated with respect to the thermal storage elements by means of surrounding electrical gas insulations 8. The resistive heaters 53 are preferably connected in parallel to the electric energy supply 9.

An embodiment of an energy storage device according to the second inventive concept, i.e. with an electric gas insulation 8 between the resistive heaters 53 and the thermal storage elements 3, is shown in FIGS. 20a and 20b. Of course, the energy storage device as shown in FIGS. 20a and 20b could alternatively or additionally also be designed in accordance to the first inventive concept.

The thermal storage elements 3 and the resistive heaters 53 of the energy storage device of FIGS. 20a and 20b are located inside a thermal insulation 6. The electric energy is supplied and distributed to the plurality of resistive heaters 53 by means of an electric energy bus 17 which is also arranged within the thermal insulation 6. Therefore, the electrical heating device 5 and in particular the electric energy bus 17 within the thermal insulation 6 also become hot during the charging process and, consequently, should be made from a thermally resistive material. Outside of the thermal insulation 6, a (cold) supply line 19 connects the electric energy bus 17 to standard electrical equipment, such as a bus bar, a transformer and/or the public grid. This standard electrical equipment is usually made from material with low thermal resistance (e.g. cupper) and needs to be protected from thermal heating.

In order to prevent the cold supply line 19 from heating up, an interface unit 20 with a blower 22 is provided. The blower 22 serves to cool the connection between the electric energy bus 17 and the supply line 19 by air or by another coolant. In order to keep thermal losses at a minimum, the connection between the electric energy bus 17 and the supply line 19 is preferably arranged in a cooling box 21. The cooling box 21 is arranged outside of the thermal insulation 6 and attached to the housing 2.

Thus, during the charging process, the connection between high temperature electric energy bus 17 and the low temperature supply line 19 is forced cooled by means of the blower 22. As long as the charging process is relatively fast, the overall thermal losses are small. As soon as the charging processes is finished and the supply of electric energy is not needed anymore, the supply line 19 can be physically disconnected from the electric energy bus 17, such that no thermal conduction from the energy bus 17 to the supply line 19 can occur. As a consequence, the blower 22 can be switched off at the same time. For physically disconnecting the supply line 19 from the electric energy bus 17, the interface unit 20 is adapted to decouple the respective coupling elements of the supply line 19 and of the electric energy bus 17 in such a way that, in the decoupled state, the coupling elements are arranged distantly from each other, as is shown in FIG. 20b. Thus, by physically, i.e. mechanically, disconnecting the electric energy bus 17 and thus the electrical heating device 5 from the electric supply 19, thermal losses can be kept at a minimum. After completion of the charging process, i.e. during storage time and during the discharge process, an overheating of the cooling box 21 is prevented by natural convection. As a protective measure, the blower 22 can temporarily be switched on, if the temperature inside of the cooling box 21 rises above a certain threshold. The interface unit 20 is preferably adapted to automatically disconnect the electric energy bus 17 from the supply line 19.

FIG. 21 shows an embodiment according to the first or second inventive concept in which the thermal storage elements 3 have a cuboid shape. A plurality of channels 41 are arranged within a steam generation block 4 which has a cuboid, in particular plate-like configuration. The channels 41 extend in a straight line in parallel through the steam generation block 4. The steam generation block 4 is sandwiched between two thermal storage elements 2. Due to the flat and same sized outer surfaces of the thermal storage elements 2 and of the steam generation block 4, optimal transfer of thermal energy from the thermal storage elements 3 to the steam generation block 4 is achieved during the discharge process. By arranging more thermal storage elements 3 and steam generation blocks 4 on top of the upper thermal storage element 3, the energy storage device can easily be scaled, in order to increased its thermal capacity. The entire block of thermal storage elements 3 and steam generation block(s) 4 is held together by means of gravitational forces.

Another easy scalable embodiment of an energy storage device is shown in FIG. 22, where the thermal storage elements 3 have a hexagonal shape with in each case six lateral surfaces. A steam generation block 4 is arranged between each pair of adjacent lateral surfaces.

The energy storage device as shown in FIG. 23 comprises three thermal storage elements 3. The cross-section of these thermal storage elements 3 is shaped as a circular sector in each case. The three elements are arranged such as to form a circle, with a steam generation block 4 being arranged between each pair of radial surfaces.

Preferred embodiments of energy storage devices are shown in FIGS. 24 and 25, where a plurality of cuboid thermal storage elements 3 are stacked on each other, with steam generation blocks 4 being arranged between the thermal storage elements 3. The steam generation blocks 4 can be arranged along horizontal (FIG. 24) or vertical (FIG.

25) surfaces of the thermal storage elements 3. The arrangement of the channels 41 in separate steam generation blocks 4 leads to an easier construction and to an improved distribution of thermal stresses.

FIGS. 26 to 28 show possible preferred designs of steam generation blocks 4 for use e.g. in one of the embodiments as shown in FIGS. 21 to 25.

The steam generation block 4 as shown in FIG. 26 comprises a single serpentine channel 41 covering the entire plate-shaped steam generation block 4.

In the steam generation block 4 of FIG. 27, a plurality of straight channels 41 are extending in parallel through the steam generation block 4. The construction of a steam generation block 4 as shown in FIG. 27 is particularly easy.

A further variant of a steam generation block 4 having straight parallel channels 41 and thus an easy construction is shown in FIG. 28. In order to nevertheless have a serpentine channel with a single inlet and a single outlet, the openings of the channels 41 are connected by means of connection elements 42 in the form of curved tubes.

FIGS. 29 to 31 show different variants of thermal storage elements 3 with an integrated channel 41 for guiding a fluid, in order to transfer the thermal energy to the fluid during the discharging process.

In the variant of FIG. 29, the thermal storage element 3 comprises an inner serpentine-shaped channel 41. The thermal storage element 3 has a single inlet and a single outlet. In order to simplify the construction of the thermal storage element 3 of FIG. 29, to enable access to the inside of the channel 41 for e.g. cleaning purposes and/or to reduce thermal stresses, the thermal storage element 3 can be split in two parts along the dash-dotted line as shown in FIG. 29. In this case, the channel 41 would be formed by a groove in the abutting surface of one or both of the parts of the thermal storage element 3. A respective splitting into two parts with channels in the form of grooves can also be provided in the variants of FIGS. 30 and 31.

In the thermal storage element 3 of FIGS. 30 and 31, two channels 41 extend along straight lines and in parallel through the respective element in each case. A serpentine channel is achieved in FIG. 31 by connecting two openings by means of a connecting element 42.

In FIGS. 32 and 33, two particularly preferred embodiments of an energy storage device according to the second inventive concept are shown. In both embodiments, a plurality of cuboid thermal storage elements 3 stacked on each other are provided. Steam generation blocks 4 with channels 41 for discharging the thermal energy by means of a fluid are arranged vertically (FIG. 32) or horizontally (FIG. 33) between the thermal storage elements 3. The plate-shaped steam generation blocks 4 are designed in accordance with the embodiment shown in FIG. 28, i.e. with straight parallel channels 41 that are interconnected by means of connection elements 42. For supplying the fluid, e.g. water W, to the steam generation blocks 4, a common supply tube 15 is provided, and for collecting the heated fluid, e.g. superheated steam S, from the steam generation blocks 4, a common collection tube 16 is provided. The steam generation blocks 4 are connected in parallel to the supply tube 15 and the collection tube 16.

Between each pair of stacks of thermal storage elements 3, a resistive heater 53 of a common electrical heating device 5 is arranged. The plurality of resistive heaters 53 are arranged in parallel and extend along vertical planes. In each case, the resistive heater 53 is formed by a meander-shaped stripe with flat surfaces and is surrounded by an electric insulation 8 in the form of a gas insulation. For supplying electric energy to the resistive heaters 53, a first electric energy bus 17 and a second electric energy bus 18 are provided. The resistive heaters 53 are connected in parallel to the first and the second electric energy bus 17, 18.

The advantages of the embodiments of FIGS. 32 and 33 are particularly the easy scalability and construction of the energy storage device. The construction is modular, such that the energy storage device can be adapted to any required storage capacity using the same type of elements.

The invention is of course not limited to the preceding presented embodiments and a plurality of modifications is possible. For example, it is possible to arbitrarily combine the embodiments of FIGS. 1 to 33. Arbitrary embodiments are easily conceivable that combine the first and the second inventive concept. A possible energy storage device can comprise one or more multi-pass and/or one or more single-pass energy storage units arranged in series and/or in parallel. The thermal storage elements 3 of different energy storage units can also be made of different solid materials and/or of different shapes. A plurality of further modifications is possible.

| REFERENCE NUMERALS | |
|---|---|
| 1 | Energy storage unit |
| 2 | Housing |
| 3 | Thermal storage element |
| 4 | Steam generation block |
| 5 | Electrical heating device |
| 6 | Thermal insulation |
| 7 | Electric insulation |
| 8 | Electric insulation |
| 9 | Electric energy supply |
| 10 | Pump |
| 11 | Steam collector |
| 12 | Valve |
| 13 | Valve |
| 14 | Steam turbine |
| 15 | Supply tube |
| 16 | Collection tube |
| 17 | Electric energy bus |
| 18 | Electric energy bus |
| 19 | Cold electric supply line |
| 20 | Interface unit |
| 21 | Cooling box |
| 22 | Blower |
| 41 | Channel |
| 42 | Connection element |
| 51 | Contact electrode |
| 52 | Induction coil |
| 53 | Resistive heater |
| 81 | Spacer |
| W | Water |
| S | Steam |
| A | Air |
| PD | Principal heat propagation direction |

The invention claimed is:

1. An energy storage device with at least one energy storage unit comprising
a thermal storage element made of a solid material, for storing thermal energy;
an electrical heating device for heating the thermal storage element by means of electric energy; and
an electric insulation, in order to electrically insulate the electrical heating device from the thermal storage element,
wherein the electric insulation is a gas insulation.

2. The energy storage device as claimed in claim 1, wherein the thermal storage element has an electric resistivity of less than $10^{-4}$ $\Omega$m.

3. The energy storage device as claimed in claim 1, wherein the electrical heating device comprises a resistive stripe with varying cross-sectional area and/or varying surface coverage along a surface of the thermal storage element.

4. The energy storage device as claimed in claim 1, wherein the electrical heating device comprises a resistive rod or tube that is inserted in a hole provided in the thermal storage element.

5. The energy storage device as claimed in claim 1, wherein the energy storage device comprises a plurality of energy storage units, and wherein the thermal storage element of each energy storage unit comprises at least one flat surface, such that the thermal storage elements are adapted to abut each other with their respective flat surfaces.

6. The energy storage device as claimed in claim 5, wherein each of the thermal storage elements has an overall cuboid.

7. The energy storage device as claimed in claim 5, wherein the electrical heating device has an overall flat configuration, in order to be arranged between the flat surfaces of at least two adjacent thermal storage elements.

8. The energy storage device as claimed in claim 1, wherein the energy storage device comprises an interface unit for connecting the electrical heating device of at least one of the energy storage unit(s) to an electric supply, and wherein the interface unit comprises a cooling device.

9. The energy storage device as claimed in claim 1, wherein the solid material of the thermal storage element forms a miscibility gap phase system.

10. The energy storage device as claimed in claim 1, wherein the at least one energy storage unit comprises a channel which is adapted to guide a fluid through the energy storage device, in order to transfer thermal energy from the thermal storage element to the fluid.

11. The energy storage device according to claim 10, wherein the channel is arranged in a steam generation block that is adapted to be arranged directly adjacent to the thermal storage element.

12. The energy storage device as claimed in claim 10, wherein the channel extends such through the thermal storage element, that the temperature distribution remains essentially homogeneous within the entire thermal storage element during the transfer of thermal energy from the thermal storage element to the fluid.

13. The energy storage device as claimed in claim 10, wherein the channel extends such through the thermal storage element, that a temperature stratification between an inlet and an outlet of the channel evolves during the transfer of thermal energy from the thermal storage element to the fluid.

14. The energy storage device as claimed in claim 1, wherein each of the thermal storage elements has an overall cuboid shape and each electrical heating device has an overall flat configuration, wherein steam generation blocks are provided, each steam generation block having an overall cuboid configuration and comprising a channel for guiding a fluid, and wherein the electrical heating devices are adapted to be arranged between the thermal storage elements and the steam generation blocks are adapted to be arranged between the thermal storage elements, such that the energy storage device can be modularly designed with an arbitrary number of thermal storage elements, electrical heating devices and steam generation blocks.

15. A method for storing energy by means of an energy storage device, with at least one energy storage unit which comprises a thermal storage element made of a solid material, a channel which is adapted to guide a fluid through the energy storage device, in order to transfer thermal energy from the thermal storage element to the fluid, an electrical heating device for heating the thermal storage element by means of electric energy and an electric insulation in the form of a gas insulation, in order to electrically insulate the electrical heating device from the thermal storage element, the method comprising the steps of heating the thermal storage element using the electrical heating device; and guiding a fluid through the channel, in order to transfer thermal energy from the thermal storage element to the fluid.

16. The method as claimed in claim 15, wherein the heated fluid is used to drive a steam turbine.

17. The method as claimed in claim 15, wherein the channel is purged by means of a gas before the thermal storage element is heated.

18. The method as claimed in claim 15, wherein at least two energy storage units are arranged in parallel to each other and are heated to different temperatures by means of the respective electrical heating devices, wherein the fluid is guided in at least two fluid streams through the respective channels, and wherein the at least two fluid streams are regulated, in such a way that, after mixing the two fluid streams with each other, a resulting predetermined goal pressure, mass flow and/or temperature of the fluid is achieved.

19. The method as claimed in claim 15, wherein at least two energy storage units are arranged in series, with a second energy storage unit being arranged downstream of a first energy storage unit, wherein the first energy storage unit is heated to a different temperature than the second energy storage unit by means of the respective electrical heating device, and wherein the temperature of the second energy storage unit corresponds to a predetermined goal temperature of the fluid.

* * * * *